United States Patent
Wi et al.

(10) Patent No.: US 11,372,446 B2
(45) Date of Patent: Jun. 28, 2022

(54) FOLDABLE ELECTRONIC DEVICE AND METHOD FOR DISPLAYING INFORMATION IN FOLDABLE ELECTRONIC DEVICE

(71) Applicant: Samsung Electronics Co., Ltd., Gyeonggi-do (KR)

(72) Inventors: Daehan Wi, Gyeonggi-do (KR); Jongjin Kim, Gyeonggi-do (KR); Jeongmin Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 252 days.

(21) Appl. No.: 16/845,574

(22) Filed: Apr. 10, 2020

(65) Prior Publication Data

US 2020/0333835 A1 Oct. 22, 2020

(30) Foreign Application Priority Data

Apr. 17, 2019 (KR) .................. 10-2019-0044870

(51) Int. Cl.
*G06F 1/16* (2006.01)
*G09G 3/00* (2006.01)
(Continued)

(52) U.S. Cl.
CPC .......... *G06F 1/1616* (2013.01); *G06F 1/1681* (2013.01); *G06F 1/1694* (2013.01);
(Continued)

(58) Field of Classification Search
CPC .... G06F 1/1616; G06F 1/1641; G06F 1/1647; G06F 1/1652; G06F 1/1677; G06F 2200/1637; G09G 3/035; G06T 3/40
See application file for complete search history.

(56) References Cited

U.S. PATENT DOCUMENTS

2012/0306910 A1 12/2012 Kim et al.
2014/0009287 A1 1/2014 Hwang
(Continued)

FOREIGN PATENT DOCUMENTS

CN 108228032 6/2018
EP 2 530 941 12/2012
(Continued)

OTHER PUBLICATIONS

International Search Report dated Jul. 6, 2020 issued in counterpart application No. PCT/KR2020/004092, 9 pages.
(Continued)

*Primary Examiner* — Priyank J Shah
(74) *Attorney, Agent, or Firm* — The Farrell Law Firm, P.C.

(57) ABSTRACT

An electronic device includes a foldable housing, a sensor module, a display, a processor operatively connected to the sensor module and the display, and memory operatively connected to the processor. The memory may store instructions that, when executed, cause the processor to determine a visual line of a user, based on obtaining direction information of the electronic device when the foldable housing is in a fully unfolded state; sense an angle between the first housing and the second housing when folding of the foldable housing is sensed via the sensor module; determine a direction of the first face of the display and a direction of the third face of the display; and determine at least one of a position or a size of a content displayed on the display, based on at least one of the visual line of the user, the direction of the first face, or the direction of the third face.

20 Claims, 22 Drawing Sheets

(51) Int. Cl.
*H04L 1/00* (2006.01)
*H04N 7/173* (2011.01)

(52) U.S. Cl.
CPC ............. *G09G 3/00* (2013.01); *H04L 1/0001* (2013.01); *G06F 2200/1614* (2013.01); *G06F 2200/1637* (2013.01); *H04N 7/173* (2013.01)

(56) References Cited

U.S. PATENT DOCUMENTS

| | | |
|---|---|---|
| 2014/0009387 A1 | 1/2014 | Hwang |
| 2014/0285450 A1 | 9/2014 | Cho et al. |
| 2014/0292650 A1* | 10/2014 | Xiong .................. G06F 3/0487 345/156 |
| 2014/0375219 A1 | 12/2014 | Lee et al. |
| 2014/0375702 A1 | 12/2014 | Cho et al. |
| 2015/0221065 A1 | 8/2015 | Kim et al. |
| 2015/0338888 A1 | 11/2015 | Kim et al. |
| 2016/0034047 A1 | 2/2016 | Lee et al. |
| 2016/0132074 A1 | 5/2016 | Kim et al. |
| 2016/0187994 A1 | 6/2016 | La et al. |
| 2016/0381014 A1 | 12/2016 | Kim |
| 2018/0137801 A1* | 5/2018 | An ....................... G09G 3/2092 |

FOREIGN PATENT DOCUMENTS

| | | |
|---|---|---|
| EP | 2 980 674 | 2/2016 |
| KR | 1020160055646 | 5/2016 |
| WO | WO 2016/039498 | 3/2016 |

OTHER PUBLICATIONS

European Search Report dated Feb. 24, 2022 issued in counterpart application No. 20791955.6-1216, 10 pages.

* cited by examiner $\theta_1 > \theta_2$ $\theta_1 < \theta_2$

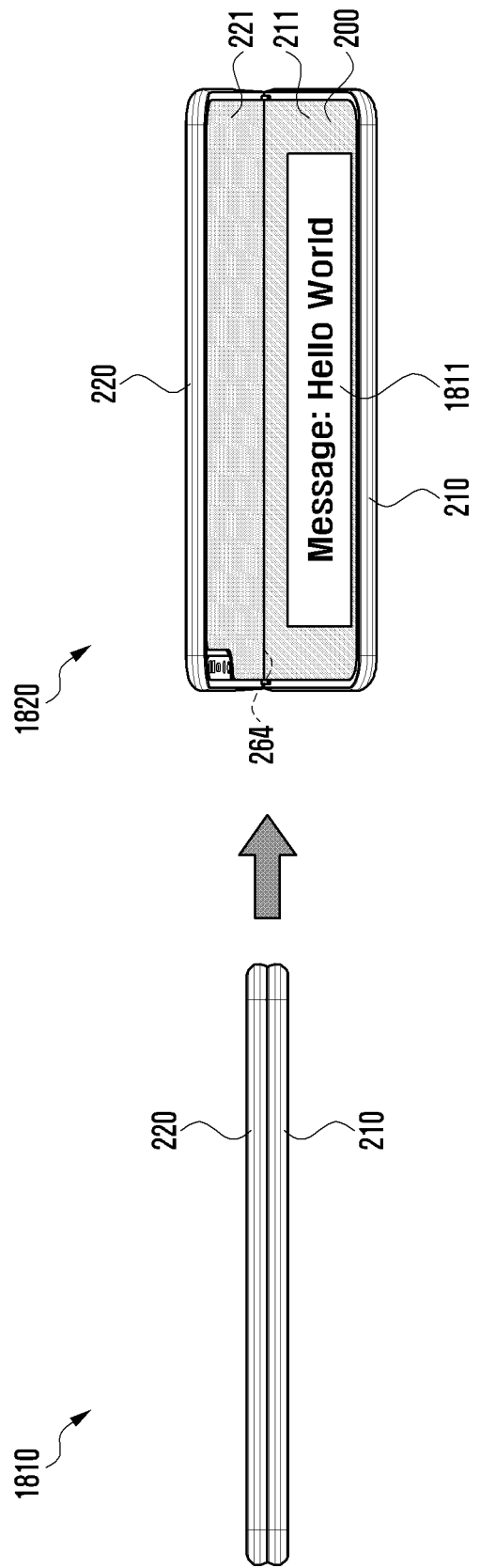

FOLDABLE ELECTRONIC DEVICE AND METHOD FOR DISPLAYING INFORMATION IN FOLDABLE ELECTRONIC DEVICE

CROSS-REFERENCE TO RELATED APPLICATION(S)

This application is based on and claims priority under 35 U.S.C. § 119 to Korean Patent Application No. 10-2019-0044870, filed on Apr. 17, 2019, in the Korean Intellectual Property Office, the disclosure of which is incorporated by reference herein in its entirety.

BACKGROUND

1. Field

The present disclosure relates generally to a foldable electronic device and a method of displaying information in the foldable electronic device.

2. Description of Related Art

Research and development on a foldable electronic device in which a housing can be in a folded state or an unfolded state about a hinge has been actively conducted. A foldable electronic device is expected to be a next-generation electronic device in that the area of the display can be increased in the unfolded state while the volume can be decreased in the folded state, thereby increasing user convenience.

As the use of electronic devices has increased in public places, technologies for protecting information displayed on the displays of electronic devices from surrounding people and preventing invasion of personal privacy are in demand.

However, when a first housing and a second housing of a foldable electronic device form a predetermined angle therebetween, a display may be disposed on the left or right side of the user. Accordingly, information displayed on the display may be exposed to surrounding people, which creates an information security problem.

SUMMARY

The present disclosure has been made to address the above-mentioned problems and disadvantages, and to provide at least the advantages described below.

In accordance with an aspect of the disclosure, an electronic device includes a foldable housing including a hinge; a first housing connected to the hinge, and including a first face oriented in a first direction, and a second face oriented in a second direction opposite the first direction; and a second housing connected to the hinge, and including a third face oriented in a third direction, and a fourth face oriented in a fourth direction opposite the third direction, the second housing being folded to the first housing about the hinge, wherein, when the foldable housing is in a folded state, the first face faces the third face, and when the foldable housing is in a fully unfolded state, the third direction conforms to the first direction; a sensor module; a display including a first portion and a second portion extending from the first face to the third face so as to form the first face and the third face, respectively; a processor operatively connected with the sensor module and the display; and a memory operatively connected to the processor. The memory may store instructions which, when executed, cause the processor to determine a visual line of a user based on obtaining direction information of the electronic device in the fully unfolded state; sense an angle between the first housing and the second housing when folding of the foldable housing is sensed via the sensor module; determine a direction of the first face and a direction of the third face; and determine at least one of a position or a size of a content displayed on the display based on at least one of the visual line of the user, the direction of the first face, or the direction of the third face.

In accordance with another aspect of the disclosure, a method of displaying information in an electronic device that includes a foldable housing including a hinge; a first housing connected to the hinge, and including a first face oriented in a first direction, and a second face oriented in a second direction opposite the first direction; and a second housing connected to the hinge, and including a third face oriented in a third direction, and a fourth face oriented in a fourth direction opposite the third direction, the second housing being folded to the first housing about the hinge, in which, when the foldable housing is in a folded state, the first face faces the third face and when the foldable housing is in a fully unfolded state, the third direction conforms to the first direction; a sensor module; and a display including a first portion and a second portion extending from the first face to the third face so as to form the first face and the third face, respectively. The method includes determining a visual line of a user, based on obtaining direction information of the electronic device in the fully unfolded state; sensing an angle between the first housing and the second housing when folding of the foldable housing is sensed via the sensor module; determining a direction of the first face and a direction of the third face; and determining at least one of a position or a size of a content displayed on the display, based on at least one of the visual line of the user, the direction of the first face, or the direction of the third face.

In accordance with another aspect of the disclosure, a non-transitory computer-readable storage medium with instructions stored thereon executed by at least on processor to perform a method of operating an electronic device that includes a foldable housing including a hinge; a first housing connected to the hinge, and including a first face oriented in a first direction, and a second face oriented in a second direction opposite the first direction; and a second housing connected to the hinge, and including a third face oriented in a third direction, and a fourth face oriented in a fourth direction opposite the third direction, the second housing being folded to the first housing about the hinge, in which, when the foldable housing is in a folded state, the first face faces the third face and when the foldable housing is in a fully unfolded state, the third direction conforms to the first direction; a sensor module; and a display including a first portion and a second portion extending from the first face to the third face so as to form the first face and the third face, respectively. The method includes determining a visual line of a user, based on obtaining direction information of the electronic device in the fully unfolded state; sensing an angle between the first housing and the second housing when folding of the foldable housing is sensed via the sensor module; determining a direction of the first face and a direction of the third face; and determining at least one of a position or a size of a content displayed on the display, based on at least one of a visual line of a user, the direction of the first face, or the direction of the third face.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 18 is a view for describing a method of displaying a notification message when the foldable electronic device is switched from a fully folded state to an unfolded state, according to an embodiment.

DETAILED DESCRIPTION

Various embodiments disclosed herein may provide a foldable electronic device, which is capable of adjusting an area and a position of displayed content based on an angle between the first housing and the second housing while the first housing and the second housing are in a folded state in which the first housing and the second housing form a predetermined angle therebetween. In addition, a method of displaying information in the foldable electronic device is also provided.

Figure 1:
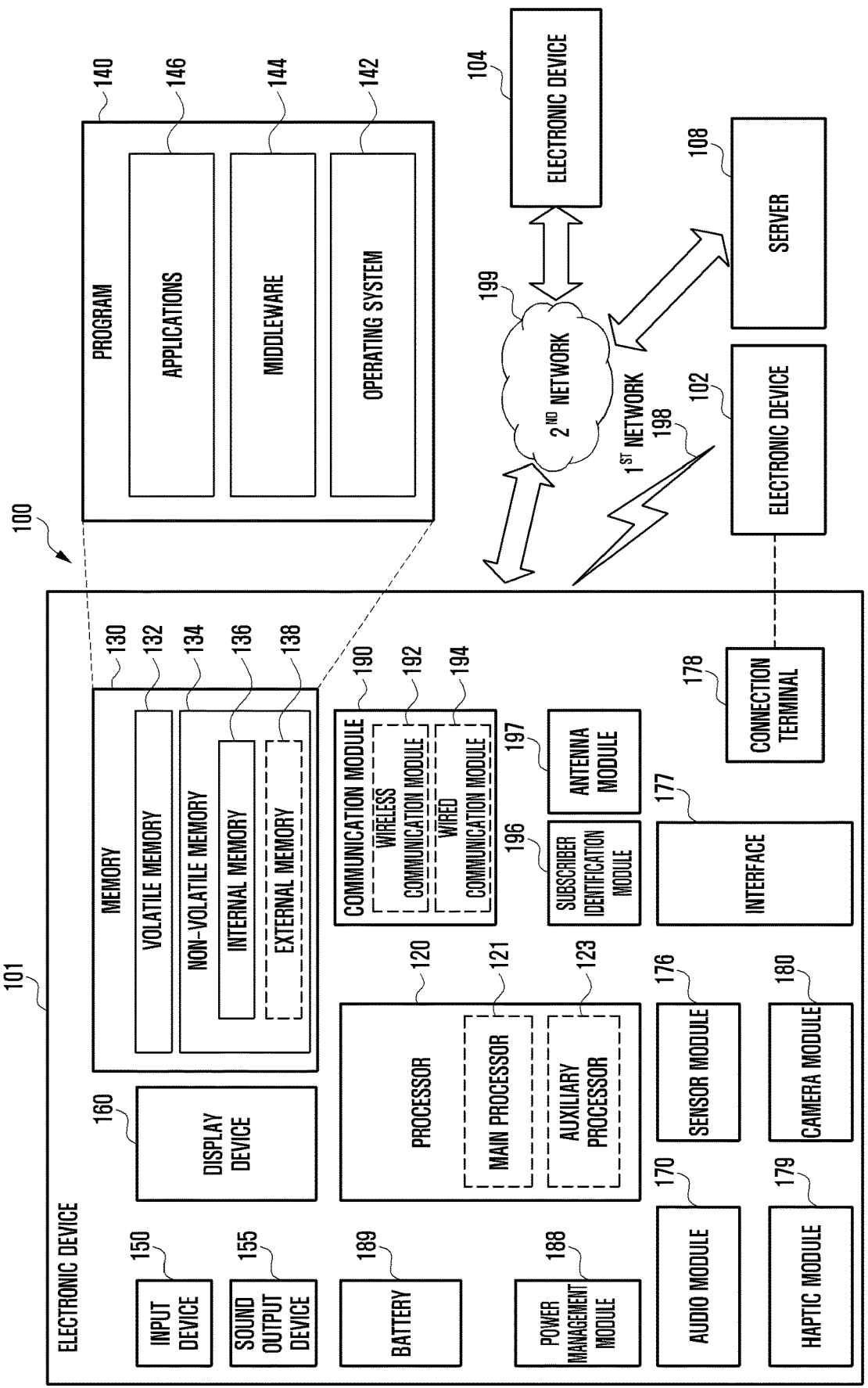
FIG. 1 is a block diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, an electronic device may include a foldable housing including a hinge; a first housing connected to the hinge, and including a first face oriented in a first direction, and a second face oriented in a second direction opposite the first direction; and a second housing connected to the hinge, and including a third face oriented in a third direction, and a fourth face oriented in a fourth direction opposite the third direction, the second housing being folded to the first housing about the hinge, wherein, when the foldable housing is in a folded state, the first face faces the third face and when the foldable housing is in a fully unfolded state, the third direction conforms to the first direction; a sensor module; a display including a first portion and a second portion extending from the first face to the third face so as to form the first face and the third face, respectively; a processor operatively connected with the sensor module and the display; and a memory operatively connected with the processor. The memory stores instructions that, when executed, cause the processor to determine a visual line of a user, based on obtaining direction information of the electronic device in the fully unfolded state, sense an angle between the first housing and the second housing when folding of the foldable housing is sensed via the sensor module, determine the direction of the first face and the direction of the third face, and determine at least one of a position or a size of a content displayed on the display 405, based on at least one of the visual line of a user, the direction of the first face, or the direction of the third face.

The instructions may cause the processor, as an operation of determining the visual line of the user, to determine the direction of the first face or the direction of the third face when the foldable housing is in the unfolded state, and determine the direction of the first face or the direction of the third face as the visual line of the user.

The sensor module may include a first motion sensor embedded in the first housing, and the instructions may cause the processor, as an operation of determining the direction of the first face and the direction of the third face, to determine the direction of the first face using the first motion sensor, and determine the direction of the third face, based on the direction of the first face and the angle between the first housing and the second housing. The sensor module may include a first motion sensor embedded in the first housing and a second motion sensor embedded in the second housing.

The instructions may cause the processor, as an operation of determining the direction of the first face and the direction of the third face, to determine the direction of the first face using the first motion sensor, and determine the direction of the third face using the second motion sensor.

The instructions may cause the processor to determine a display region in the display and a non-display region in the display, based on at least one of the visual line of the user, the direction of the first face, or the direction of the third face, and display the content on the determined display region.

The instructions may cause the processor to determine at least one of the position or the area of the display region, based on at least one of the visual line of the user, the direction of the first face, or the direction of the third face.

The instructions may cause the processor to sense a rotation of the electronic device about the folding axis of the hinge while the content is displayed on the display region, re-determine the direction of the first face and the direction of the third face, based on a rotation direction of the electronic device, and adjust at least one of the position or the size of the content, based on the re-determined directions of the first face and the third face.

The first portion of the display may be disposed on the right of the second portion when the display is viewed from above, the instructions may cause the processor to move the content displayed on the display region in a fifth direction from the second portion toward the first portion when the electronic device rotates counterclockwise about the folding axis of the hinge, and move the content displayed on the display region in a sixth direction from the first portion toward the second portion when the electronic device rotates clockwise about the folding axis of the hinge.

The instructions may cause the processor to receive a notification event when the electronic device is in a fully folded state and the visual line of the user is perpendicular to the ground, sense unfolding of the foldable housing after receiving the notification event, check whether a condition in which the angle between the first housing and the second housing is maintained in a predetermined range for a predetermined time is satisfied, and cause a message corresponding to the notification event to be displayed on at least one of the first face and the third face parallel to the ground when the condition is satisfied. The instructions may cause the processor to cause the message corresponding to the notification event to be displayed in a direction parallel to the hinge. The sensor module may include an angle sensor and a motion sensor disposed in the first housing and/or the second housing.

Figure 2A:
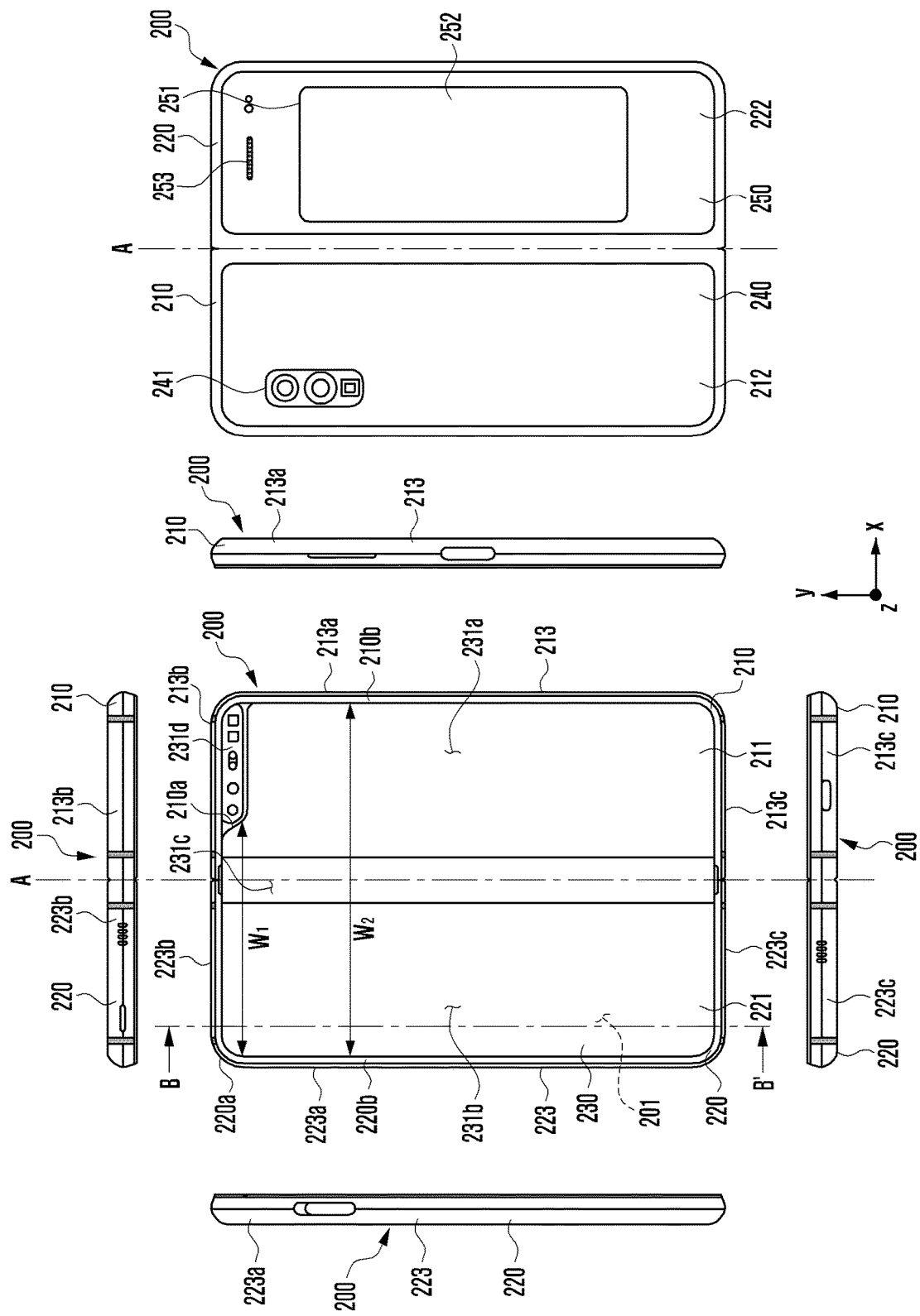
FIG. 2A illustrates an electronic device in an unfolded state, according to an embodiment.
Figure 2B:
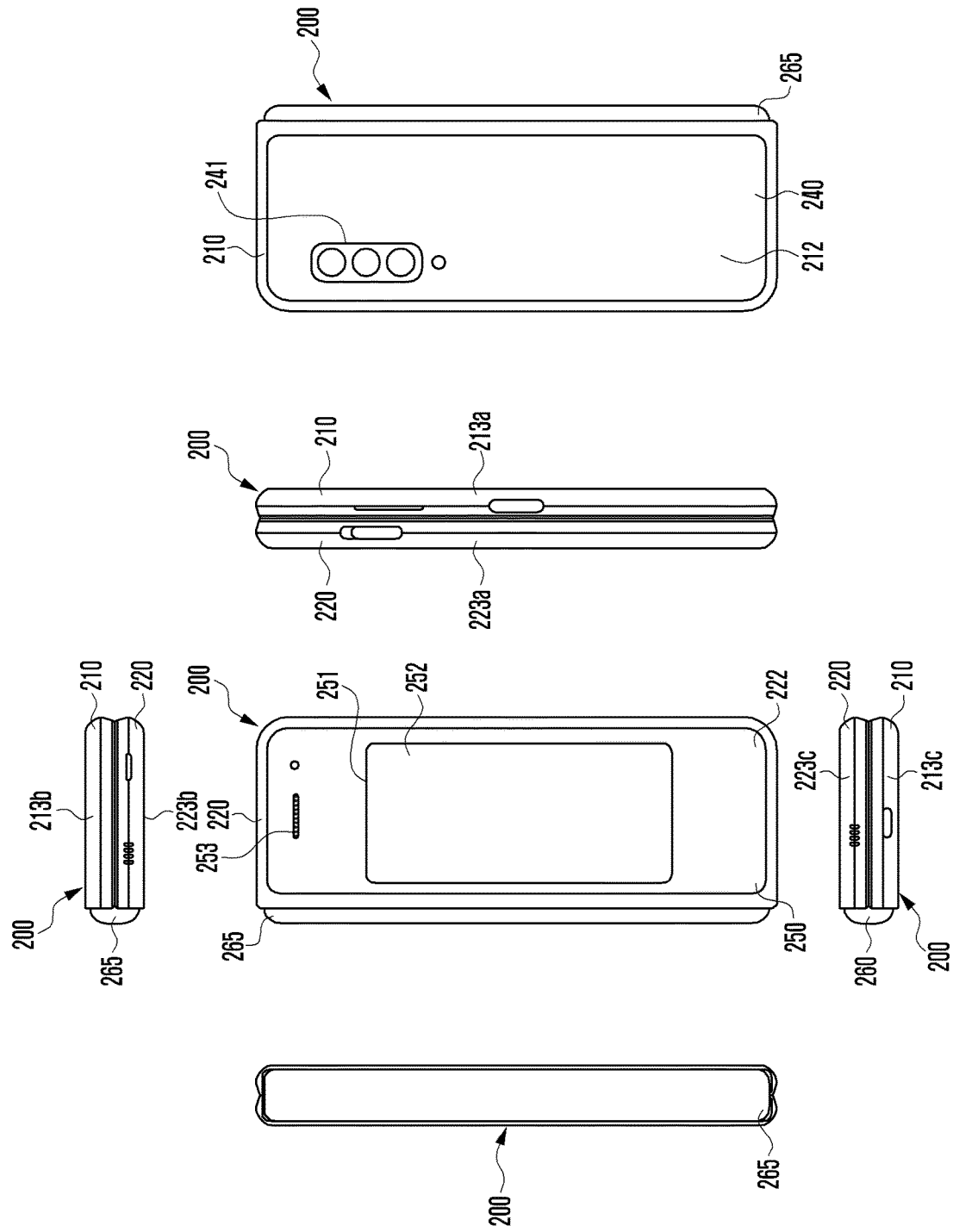
FIG. 2B illustrates the electronic device in a folded state, according to an embodiment.

FIG. 2A illustrates an electronic device in an unfolded state, according to an embodiment. FIG. 2B illustrates an electronic device in a folded state, according to an embodiment.

Referring to FIG. 2A, the electronic device 200 includes a pair of housings 210 and 220 rotatably coupled to each other via a hinge 264 so as to be folded with respect to each other, a hinge cover 265 configured to cover the foldable portions of the pair of housings 210 and 220, and a display 230 (e.g., a flexible display, a foldable display, or a first display) disposed in a space formed by the pair of housings 210 and 220. Herein, the face on which the display 230 is disposed may be defined as a front face of the electronic device 200, and the face opposite the front face may be defined as a rear face of the electronic device 200. In addition, the face surrounding the space between the front face and the rear face may be defined as a side face of the electronic device 200.

The pair of housings 210 and 220 includes a first housing 210 and a second housing 220. The first housing 210 may include a sensor region 231d, and the first housing 210 and the second housing 220 may respectively include a first rear cover 240 and a second rear cover 250. The pair of housings 210 and 220 of the electronic device 200 are not limited to the shape and assembly illustrated in FIGS. 2A and 2B, but may be implemented in other shapes, combinations and/or configurations of components. For example, the first housing 210 and the first rear cover 240 may be integrally formed, and the second housing 220 and the second rear cover 250 may be integrally formed.

The first housing 210 and the second housing 220 may be disposed on opposite sides about a folding axis A, and may have generally symmetrical shapes with respect to the folding axis A. The angle or distance between the first housing 210 and the second housing 220 may vary depending on whether the electronic device 200 is in the unfolded state (the flat state or the closed state), in the folded state, or in the intermediate state. Unlike the second housing 220, the first housing 210 may further include the sensor region 231d in which various sensors are disposed. However, the first housing 210 and the second housing 220 may have mutually symmetrical shapes in the other regions. The sensor placement region 231d may be further disposed in or replaced with at least a region of the second housing 220.

In the unfolded state of the electronic device 200, the first housing 210 may include a first face 211 connected to the hinge 264 and arranged to face the front side of the electronic device 200, a second face 212 facing away from the first face 211, and a first side member 213 surrounding at least a part of the space between the first face 211 and the second face 212. The first side member 213 may include a first side face 213a arranged parallel to the folding axis A, a second side face 213b extending from one end of the first side face 213a in a direction perpendicular to the folding axis A, and a third face 213c extending from the other end of the first side face 213a in a direction perpendicular to the folding axis A.

In the unfolded state of the electronic device 200, the second housing 220 may include a third face 221 connected to the hinge 264 and arranged to face the front side of the electronic device 200, a fourth face 222 facing away from the third face 221, and a second side member 220 surrounding at least a part of the space between the third face 221 and the fourth face 222. The second side member 220 may include a fourth side face 223a arranged parallel to the folding axis A, a fifth side face 223b extending from one end of the fourth side face 223a in a direction perpendicular to the folding axis A, and a sixth face 223c extending from the other end of the fourth side face 223a in a direction perpendicular to the folding axis A. In an embodiment, in the folded state, the third face 221 may face the first face 211.

The electronic device 200 may include a recess 201 formed to accommodate the display 230 through structural shape coupling of the first housing 210 and the second housing 220. The recess 201 may be substantially the same size as the display 230. Due to the sensor region 231d, the recess 201 may have two or more different widths in a direction perpendicular to the folding axis A. For example, the recess 201 may have a first width $W_1$ between a first portion 220a of the second housing 220, which is parallel to the folding axis A, and a first portion 210a formed at an edge of the sensor region 231d of the first housing 210 and a second width $W_2$ between a second portion 220b of the second housing 210 and a second portion 210b that does not correspond to the sensor region 213d and is parallel to the folding axis A in the first housing 210. In this case, the second width $W_2$ may be longer than the first width $W_1$. For example, the recess 201 may be formed to have the first width $W_1$ between the first portion 210a of the first housing 210 and the first portion 220a of the second housing 220, which are asymmetric to each other, and the second width $W_2$ between the second portion 210b of the first housing 210 and the second portion 220b of the second housing 220, which are symmetric to each other. The first portion 210a and the second portion 210b of the first housing 210 may have different distances from the folding axis A. The widths of the recess 201 are not limited to the illustrated example. The recess 201 may have two or more different widths due to the shape of the sensor region 231d or the asymmetric portions of the first housing 210 and the second housing 220.

The first housing 210 and the second housing 220 may be at least partially formed of a metal material or a non-metal material having rigidity, the level of which is selected in order to support the display 230.

The sensor region 231d may be formed to have a predetermined area adjacent to one corner of the first housing 210. However, the arrangement, shape, and size of the sensor region 231d is not limited to the illustrated example. For example, the sensor region 231d may be provided at another corner of the first housing 210 or in any region between the upper and lower end corners. Additionally, the sensor region 231d may be further disposed in or replaced with at least one region of the second housing 220. In addition, the sensor region 231d may be disposed to extend over the first housing 210 and the second housing 220. The electronic device 200 may include components that perform various functions through the sensor region 231d or one or more openings provided in the sensor region 231d, and at least some of the components may be provided to be exposed to the front face of the electronic device 200. The components may include, for example, at least one of a front camera device, a receiver, a proximity sensor, an illuminance sensor, an iris recognition sensor, an ultrasonic sensor, or an indicator. The components may include, for example, at least one sensor disposed below the display 230 or disposed inside the display 230. The at least one sensor may include at least one of, for example, a fingerprint sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The first rear cover 240 may be disposed on the second face 212 of the first housing 210, and may have a substantially rectangular periphery. The periphery may be at least partially wrapped by the first housing 210. Similarly, the second rear cover 250 may be disposed on the fourth face 222 of the second housing 220, and the periphery of the second rear cover 250 may be at least partially wrapped by the second housing 220.

In the illustrated embodiment, the first rear cover 240 and the second rear cover 250 may have substantially symmetrical shapes about the folding axis A. The first rear cover 240 and the second rear cover 250 may have various different shapes. The first rear cover 240 may be formed integrally with the first housing 210, and the second rear cover 250 may be formed integrally with the second housing 220.

The first rear cover 240, the second rear cover 250, the first housing 210, and the second housing 220 may provide, through a mutually coupled, a space in which various components (e.g., a printed circuit board (PCB), an antenna module, a sensor module, or a battery) of the electronic device 200 may be arranged. One or more components may be disposed or visually exposed on the rear face of the electronic device 200. For example, one or more components or sensors may be visually exposed through a first rear region 241 of the first rear cover 240. The sensors may include a proximity sensor, a rear camera, and/or a flash. At least a portion of a sub-display 252 (e.g., the second display) may be visually exposed through a second rear region 251 of the second rear cover 250. The electronic device 200 may include a speaker module 253, which is disposed to be exposed to at least one region of the second rear cover 250.

The display 230 may be disposed in a space formed by the pair of housings 210 and 220. For example, the display 230 may be seated in the recess 101 formed by the pair of housings 210 and 220, and may be disposed to occupy substantially the majority of the front face of the electronic device 200. Accordingly, the front face of the electronic device 200 may include the display 230, as well as a region (e.g., an edge region) of the first housing 210 and a region (e.g., an edge region) of the second housing 220, which are adjacent to the display 230. The rear face of the electronic device 200 may include the first rear cover 240 and a region (e.g., an edge region) of the first housing 210 adjacent to the first rear cover 240, as well as the second rear cover 250 and a region (e.g., an edge region) of the second housing 220 adjacent to the second rear cover 250.

The display 230 may mean a display in which at least one region is deformable into a planar face or a curved face. The display 230 may include a folding region 231c, a first region 231a disposed on one side of the folding region 231c (e.g., the right region of the folding region 231c), and a second region 231b disposed on the other side of the folding region 231c (e.g., the left region of the folding region 231c). The first region 231a may be disposed in the first face 211 of the first housing 210, and the second region 231b may be disposed in the third face 221 of the second housing 220. The region division of the display 230 is exemplary, and the display 230 may be divided into multiple regions (e.g., four or more regions or two regions) depending on the functions thereof. For example, as illustrated in FIG. 2A, the regions of the display 230 may be divided by the folding region 231c or the folding axis A extending parallel to the y axis. However, the regions of the display 230 may be divided based on another folding region (e.g., a folding region parallel to the x axis) or another folding axis (e.g., a folding axis parallel to the x axis). The aforementioned region division of the display is merely physical division based on the pair of housings 210 and 220 and the hinge 264, and the display 230 may display one full screen substantially through the pair of housings 210 and 220 and the hinge 264. The first region 231a and the second region 231b may have generally symmetrical shapes about the folding region 231c. However, unlike the second region 231b, the first region 231a may include a cut notch region (e.g., the notch region 233), depending on the existence of the sensor region 231d. The first region 231a may have a shape symmetrical to the first region 231b in the region other than the notch region. In other words, the first region 231a and the second region 231b may include mutually symmetrical portions and mutually asymmetrical portions.

Figure 3:
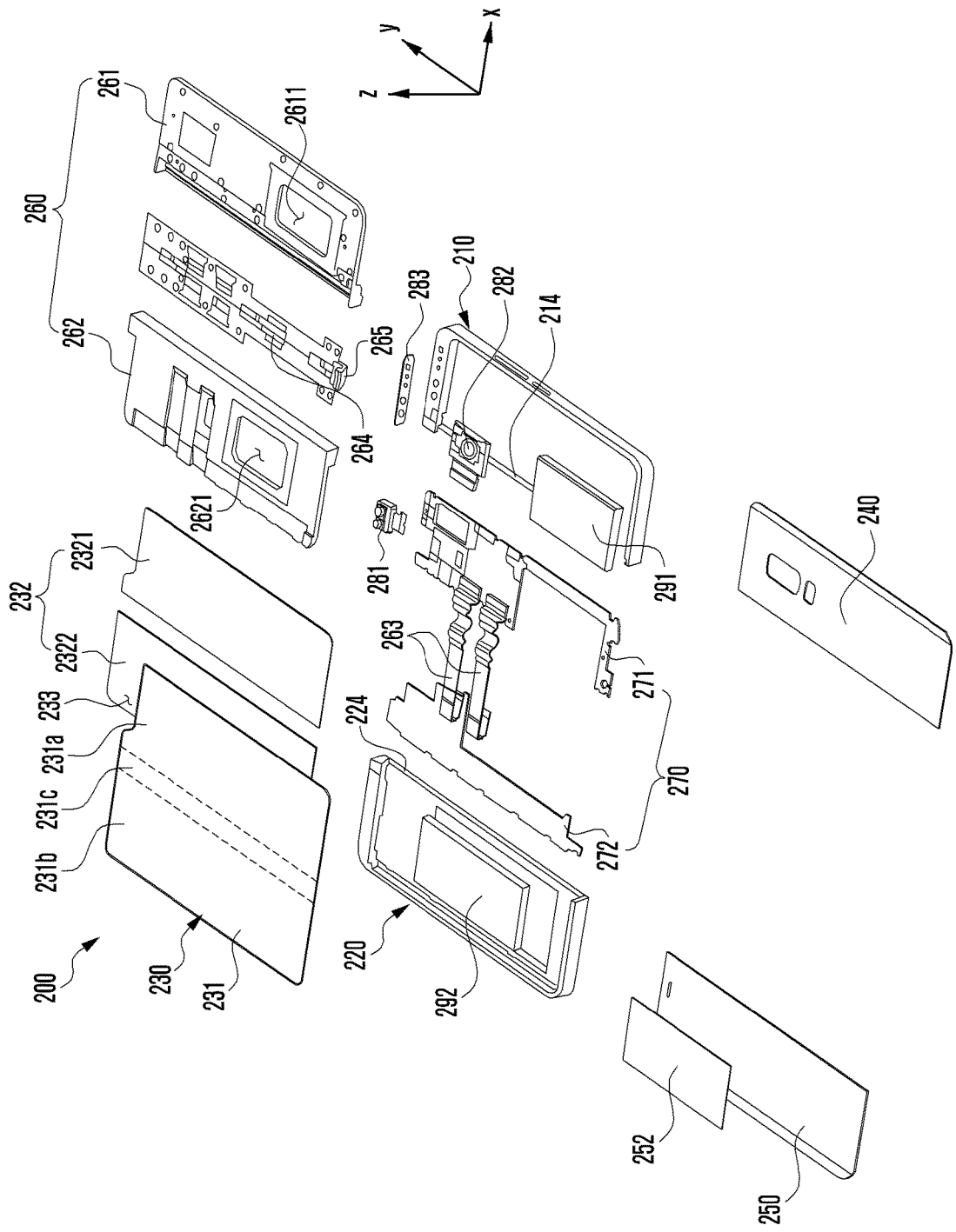
FIG. 3 is an exploded perspective view illustrating an electronic device, according to an embodiment.

Referring to FIG. 2B, the hinge cover 265 may be disposed between the first housing 210 and the second housing 220 so as to cover internal components (e.g., the hinge 264 in FIG. 3). In an embodiment, the hinge cover 265 may be covered by a portion of the first and second housings 210 and 220 or may be exposed to the outside depending on the operating state of the electronic device 200 (the unfolded state or the folded state).

As illustrated in FIG. 2A, when the electronic device 200 is in the unfolded state, the hinge cover 265 may not be exposed by being covered by the first housing 210 and the second housing 220. As illustrated in FIG. 2B, when the electronic device 200 is in the folded state (e.g., the fully folded state), the hinge cover 265 may be exposed to the outside between the first housing 210 and the second housing 220. When the first housing 210 and the second housing 220 are in the intermediate state in which the first housing 210 and the second housing 220 are folded to form a predetermined angle therebetween, the hinge cover 265 may be at least partially exposed to the outside between the first housing 210 and the second housing 220. In this case, the exposed region may be smaller than that in the fully folded state. The hinge cover 265 may include a curved face.

Hereinafter, the operations of the first housing 210 and the second housing 220 and respective regions of the display 230 depending on the operating states of the electronic device 200 (e.g., the unfolded state and the folded state) will be described.

When the electronic device 200 is in the unfolded state, the first housing 210 and the second housing 220 may form an angle of 180 degrees therebetween, and the first region 231a and the second region 231b of the display may be oriented in the same direction. In addition, the folding region 231c may form the same plane as the first region 231a and the second region 232b. When the electronic device 200 is in the unfolded state, the first housing 210 and the second housing 220 rotate by an angle of 360 degrees with respect to each other such that the second face 212 and the fourth face 222 are reversely folded so as to face each other.

When the electronic device 200 is in the folded state, the first housing 210 and the second housing 220 may be disposed to face each other. The first region 231a and the second region 231b of the display 230 may form a narrow angle (e.g., an angle between 0 and 10 degrees) relative to each other. At least a portion of the folding region 231c may be formed in a curved face having a predetermined curvature.

When the electronic device 200 is in the intermediate state, the first housing 210 and the second housing 220 may be disposed so as to form a predetermined angle therebetween. For example, the first region 231a and the second region 231b of the display 230 may form an angle greater than that in the folded state and smaller than that in the unfolded state. At least a portion of the folding region 231c may be formed in a curved face having a predetermined curvature, and the curvature in this case may be smaller than that in the folded state.

FIG. 3 is an exploded perspective view illustrating the electronic device 200, according to an embodiment.

Referring to FIG. 3, the electronic device 200 includes a first housing 210, a second housing 220, a display 230, a first rear cover 240, a second rear cover 250, a support member assembly 260, and at least one PCB 270. Herein, the display 230 (e.g., the first display) may be referred to as a display module or a display assembly.

The display 230 may include a display panel 231 (e.g., a flexible display panel), and at least one plate 232 or layer on which the display panel 231 is seated. The plate 232 may be disposed between the display panel 231 and the support member assembly 260. The display panel 231 may be disposed on at least a portion of one face of the plate 232. The plate 232 may include a first plate 2321 and a second plate 2322 divided about the hinge 264. The plate 232 includes one or more members that are not foldable together when the first housing 210 and the second housing 220 are pivoted to the folded state or the unfolded state about the hinge 264. The plate 232 may include at least one subsidiary material layer (e.g., a graphite member) and/or a conductive plate (e.g., a copper (Cu) sheet) disposed on the rear face of the display panel 231. The plate 232 may be formed in a shape corresponding to that of the display panel 231. For example, a region of the first plate 2321 may be formed in a shape corresponding to that of the notch region 233 in the display panel 231.

The support member assembly 260 may include a first support member 261 (e.g., the first support plate), a second support member 262 (e.g., the second support plate), a hinge 264 disposed between the first support member 261 and the second support member 262, a hinge cover 265 that covers the hinge 264 when the hinge 264 is viewed from the outside, and a wiring member 263 (e.g., a flexible PCB (FPCB)) extending across the first and second support members 261 and 262.

The support member assembly 260 may be disposed between the plate 232 and the at least one PCB 270. For example, the first support member 261 may be disposed between the first region 231a of the display 230 and a first PCB 271. The second support member 262 may be disposed between the second region 231a of the display 230 and a second PCB 272.

The wiring member 263 and the hinge 264 may be at least partially disposed inside the support member assembly 260. The wiring member 263 may be disposed in a direction across the first support member 261 and the second support member 262 (e.g., the x-axis direction). The wiring member 263 may be disposed in a direction (e.g., the x-axis direction) perpendicular to the folding axis (e.g., the y axis or the folding axis A in FIG. 2A) of the folding region 231c.

The at least one PCB 270 may include a first PCB 271 disposed on the first support member 261 side and a second PCB 272 disposed on the second support member 262 side. The first PCB 271 and the second PCB 272 may be disposed in a space formed by the support member assembly 260, the first housing 210, the second housing 220, the first rear cover 240, and the second rear cover 250. Components for implementing various functions of the electronic device 200 may be mounted on the first PCB 271 and the second PCB 272.

The first PCB 271 disposed in the space formed through the first support member 261 may be disposed in the first space of the first housing 210. Additionally, a first battery 291 disposed at a position facing a first swelling hole 2611 in the first support member 261 may be disposed in the first space of the first housing 210. In addition, at least one sensor module 281 or at least one camera module 282 may be included in the first space of the first housing 210. The first housing 210 may include a window glass 283 disposed in order to protect the at least one sensor module 281 and the at least one camera module 282 at a position corresponding to the notch region 233 in the display 230. The second PCB 272 disposed in the space formed through the second support member 262 may be disposed in the second space of the second housing 220. Additionally, a second battery 292 disposed at a position facing a second swelling hole 2621 in the second support member 262 may be included in the second space of the second housing 220. The first housing 210 and the first support member 261 may be integrally formed. The second housing 220 and the second support member 262 may also be integrally formed. In the second space of the second housing 220, a sub-display 252 may be disposed. The sub-display 252 (e.g., the second display) may be disposed to be visible from the outside through at least one region of the second rear cover 250.

The first housing 210 may include a first rotational support face 214, and the second housing 220 may include a second rotational support face 224, which corresponds to the first rotational support 214. The first rotational support face 214 and the second rotational support face 224 may include curved faces corresponding to curved faces included in the hinge cover 265.

When the electronic device 200 is in the unfolded state, the first rotational support face 214 and the second rotational support face 224 may cover the hinge cover 265 such that the hinge cover 265 is not exposed to the rear face of the electronic device 200 or is minimally exposed to the rear face of the electronic device 200. When the electronic device 200 is in the folded state, the first rotational support face 214 and the second rotational support face 224 may rotate along the curved face included in the hinge cover 265 such that the hinge cover 265 is exposed to the rear face of the electronic device 200 as much as possible.

Figure 4:
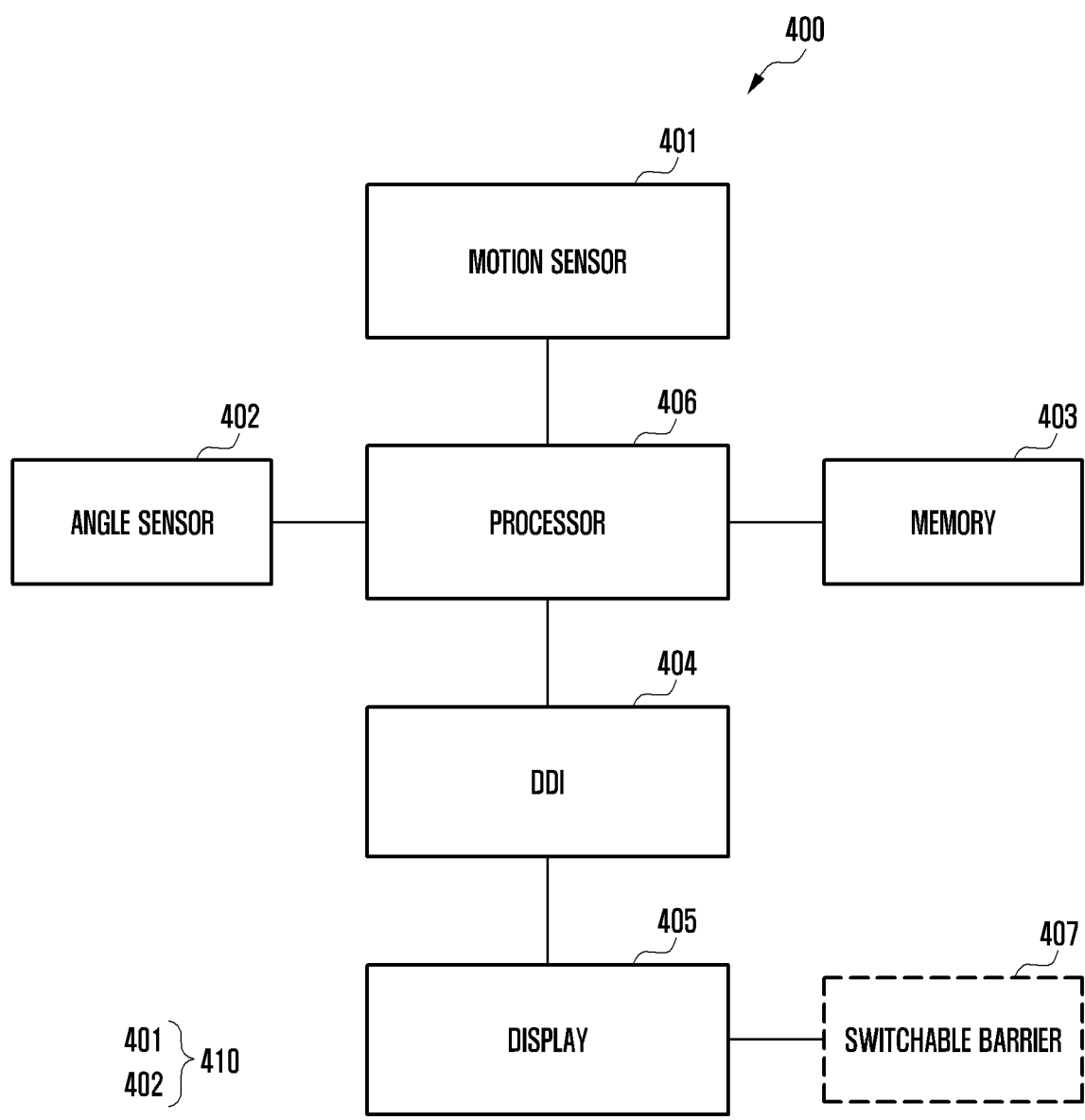
FIG. 4 is a schematic block diagram of an electronic device, according to an embodiment.

FIG. 4 is a schematic block diagram of an electronic device, according to an embodiment.

Referring to FIG. 4, an electronic device 400 includes a sensor module 410, a processor 406, a memory 403, a display driving IC (DDI) 404, and a display 405. The electronic device 400 may or may not include a switchable barrier 407.

The sensor module 410 may sense a movement of the electronic device 400 and transmit the sensed information to the processor 406. The sensor module 410 may include a motion sensor 401 and an angle sensor 402. For example, the motion sensor 401 may be a gyro sensor or an acceleration sensor, and may sense the direction information of the electronic device 400, and may transmit the sensed direction information to the processor 406. When the electronic device 400 is in the folded state, the motion sensor 401 may sense the direction of the first face 211 and the direction of the third face 221, and may transmit information about the direction of the first face 211 and the direction of the third face 221 to the processor 406. The angle sensor 402 may be disposed inside the hinge 264 so as to directly sense the angle between the first housing 210 and the second housing 220. The angle sensor 402 may be a gyro sensor or an acceleration sensor.

The sensor module may further include at least one of a gesture sensor, an atmospheric pressure sensor, a magnetic sensor, a grip sensor, a proximity sensor, a color sensor, an infrared (IR) sensor, a biometric sensor, a temperature sensor, a humidity sensor, or an illuminance sensor.

The processor 406 may control the overall operation of the electronic device 400. For example, the processor 406 may obtain information related to whether or not the electronic device 400 is folded through the sensor module, and may control the display 405, based on the obtained information.

The processor 406 may control the display 405 and/or the switchable barrier 407 via the DDI 404.

The DDI 404 may include an interface module, a memory (e.g., a buffer memory), an image processing module, or a mapping module. The DDI 404 may receive, for example, video data, or video information including a video control signal corresponding to an instruction for controlling the video data, from other components of the electronic device 400 via the interface module. For example, the DDI may receive the video information from the processor 406 or an auxiliary processor (e.g., a GPU) operated independently from the processor 406. The DDI 404 may communicate with a touch circuit or a sensor module via the interface module. The DDI 404 may store at least a part of the received video information in the memory, for example, in units of frames. The image processing module may perform pre-processing or post-processing (e.g., resolution, brightness, or size adjustment) on, for example, at least a part of the video data based at least on the characteristics of the video data or the characteristics of the display 405. The mapping module may generate a voltage value or a current value corresponding to the video data pre-processed or post-processed via the image processing module. The generation of the voltage value or the current value may be performed based at least on, for example, the attributes of the pixels of the display 405 (e.g., the array of pixels (a red, green and blue (RGB) stripe or a pentile) or the size of each of sub-pixels). At least some of the pixels of the display 405 are driven based, at least in part, on, for example, the voltage value or the current value, so that visual information (e.g., text, an image, or an icon) corresponding to the video data can be displayed through the display 405.

The switchable barrier 407 may be activated in the privacy mode of the electronic device 400 (e.g., in the state of adjusting the area or position of the content displayed on the display 405 for privacy protection). For example, the switchable barrier 407 may form a plurality of slits and a plurality of barriers, based on a control signal of the DDI 404. The switchable barrier 407 may alternately form a plurality of slits and a plurality of barriers, based on a control signal of the DDI 404. The plurality of barriers may block light that is output from the front face of the display 405 at a predetermined angle or more, among the light output through the display 405, and the plurality of slits may transmit light that is output from the front face of the display 405 within the predetermined angle, among the light output through the display 405. Accordingly, in the privacy mode of the electronic device 400, the switchable barrier 407 may block light output from the front face of the display 405 at a predetermined angle or more.

According to an embodiment, a method of displaying information in an electronic device includes a foldable housing including a hinge; a first housing connected to the hinge, and including a first face oriented in a first direction, and a second face oriented in a second direction opposite the first direction; and a second housing connected to the hinge, and including a third face oriented in a third direction, and a fourth face oriented in a fourth direction opposite the third direction, the second housing being folded to the first housing about the hinge, in which, when the foldable housing is in a folded state, the first face faces the third face and when the foldable housing is in a fully unfolded state, the third direction conforms to the first direction; a sensor module; and a display including a first portion and a second portion extending from the first face to the third face so as to form the first face and the third face, respectively, is provided. The method may include determining a visual line of a user, based on obtaining direction information of the electronic device in the fully unfolded state; sensing an angle between the first housing and the second housing when folding of the foldable housing is sensed via the sensor module; determining the direction of the first face and the direction of the third face; and determining at least one of a position or a size of a content displayed on the display, based on at least one of the visual line of a user, the direction of the first face, or the direction of the third face.

The step of determining the position of the content displayed on the display may include determining a display region in the display and a non-display region in the display, based on at least one of the visual line of the user, the direction of the first face, or the direction of the third face; and displaying the content on the determined display region.

The step of determining the position or the content displayed on the display may include determining at least one of the position or the area of the display region, based on at least one of the visual line of the user, the direction of the first face, or the direction of the third face.

The method may further include sensing a rotation of the electronic device about the folding axis of the hinge while the content is displayed on the display region; re-determining the direction of the first face and the direction of the third face, based on a rotation direction of the electronic device; and adjusting at least one of the position or the size of the content, based on the re-determined directions of the first face and the third face.

The first portion of the display may be disposed to the right of the second portion when the display is viewed from above, and the step of adjusting the position of the content, based on the re-determined directions of the first face and the third face may include moving the content displayed on the display region in a fifth direction from the second portion toward the first portion when the electronic device rotates counterclockwise about the folding axis of the hinge; and moving the content displayed on the display region in a sixth direction from the first portion toward the second portion when the electronic device rotates clockwise about the folding axis of the hinge.

The method may further include receiving a notification event when the electronic device is in a fully folded state and the visual line of the user is perpendicular to a ground; sensing unfolding of the foldable housing after receiving the notification event; checking whether a condition in which the angle between the first housing and the second housing is maintained in a predetermined range for a predetermined time is satisfied; and causing a message corresponding to the notification event to be displayed on at least one of the first face and the third face parallel to the ground when the condition is satisfied.

The method may further include causing the message corresponding to the notification event to be displayed in a direction parallel to the hinge.

According to an embodiment, a non-transitory computer-readable storage medium that stores a program for controlling an operation of an electronic device that includes a foldable housing including a hinge; a first housing connected to the hinge, and including a first face oriented in a first direction, and a second face oriented in a second direction opposite the first direction; and a second housing connected to the hinge, and including a third face oriented in a third direction, and a fourth face oriented in a fourth direction opposite the third direction, the second housing being folded to the first housing about the hinge, in which, when the foldable housing is in a folded state, the first face faces the third face and when the foldable housing is in a fully unfolded state, the third direction conforms to the first direction; a sensor module; and a display including a first portion and a second portion extending from the first face to the third face so as to form the first face and the third face, respectively, is provided. The recording medium may store a program that, when executed, causes the electronic device to determine a visual line of a user, based on obtaining direction information of the electronic device in the fully unfolded state; sense an angle between the first housing and the second housing when folding of the foldable housing is sensed via the sensor module; determine the direction of the first face and the direction of the third face; and determine at least one of a position or a size of a content displayed on the display, based on at least one of the visual line of a user, the direction of the first face, or the direction of the third face.

The recording medium may store a program that, when executed, further causes the electronic device to sense a rotation of the electronic device about the folding axis of the hinge while the content is displayed; re-determine the direction of the first face and the direction of the third face, based on a rotation direction of the electronic device; and adjust at least one of the position or the size of the content displayed in the display region, based on the re-determined directions of the first face and the third face.

Figure 5:
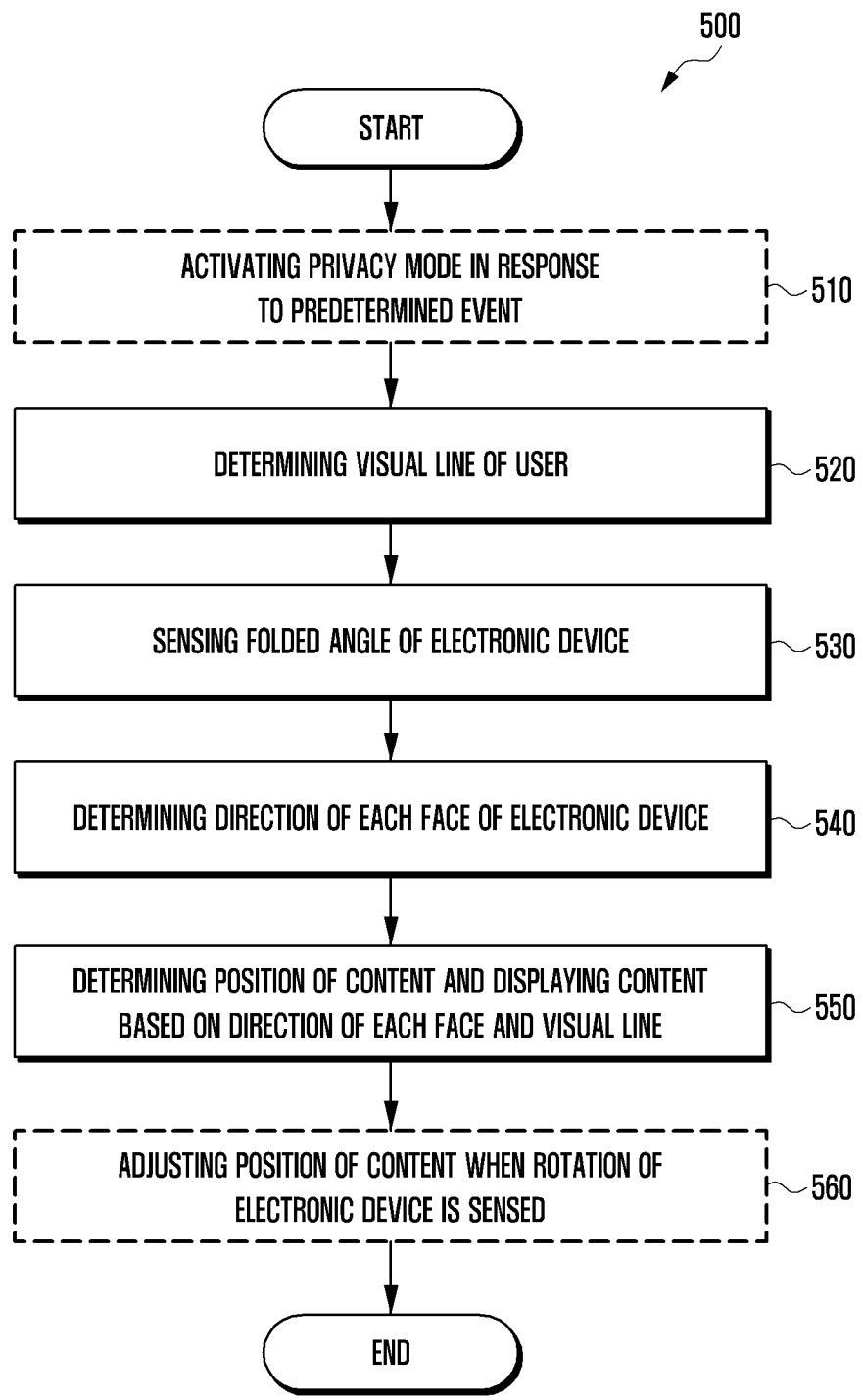
FIG. 5 is a flowchart illustrating the operation of the electronic device, according to an embodiment.

FIG. 5 is a flowchart illustrating an operation of the electronic device 400, according to an embodiment.

Referring to FIG. 5, in step 510, the electronic device 400 activates a privacy mode in response to a predetermined event. For example, the privacy mode may be a state in which the area or position of a content displayed on the display 405 is adjusted for privacy protection. The electronic device 400 may adjust the area or the position of the displayed content while the first housing 210 and the second housing 220 forms a predetermined angle therebetween in the privacy mode. When the privacy mode is deactivated, the electronic device 400 may not adjust the area or the position of the content displayed on the display 405, and may display the content or information at a resolution corresponding to video data received from the outside or video data stored in the memory 403.

The activation of the privacy mode may be set on a setting screen of the electronic device 400, based on a user input. For example, the electronic device 400 may activate the privacy mode or deactivate the privacy mode, based on the user input for selecting a predetermined object on the setting screen of the electronic device 400.

The activation of the privacy mode may be set, based on place information of the electronic device 400. For example, the electronic device 400 may obtain current place information, determine whether the place information corresponds to a designated place, and activate the privacy mode when the place information corresponds to the place designated to set the privacy mode. For example, in order to obtain current location information, the electronic device 400 may perform short-range communication with an external device, which supports short-range communication (e.g., Wi-Fi, Bluetooth (BT), radio frequency identification (RFD), Zigbee, or Zigwave), and may determine whether to activate the privacy mode, based on a result of confirming the ID, serial ID, physical address, or media access control (MAC) address of the external device via the short-range communication. The electronic device 400 may store and manage a white list or a black list in the memory in order to manage the ID or the MAC address of the external device. The electronic device 400 may add or delete information included in the white list or the black list, based on a user input through the setting screen.

Even if the privacy mode is deactivated, based on the result of confirming the ID or the MAC address of the external device through short-range communication, the electronic device 400 may activate the privacy mode when the user performs an operation of tagging near-field communication NFC through the electronic device 400. For example, it may be assumed that a first place (e.g., a conference room) and a second place (e.g., a private office) exist, and that the first and second places are both accessible to one Wi-Fi access point (AP). When the electronic device 400 has stored the first place as a "Privacy Zone" and stores the second place as a "Non-Privacy Zone", a collision may occur when the electronic device 400 accesses the Wi-Fi access point (AP). For example, in order to prevent the collision, the electronic device 400 may stores the entire place accessible to the Wi-Fi access point as a "Non-Privacy Zone" and may activate the privacy mode only when the user performs NFC tagging at the first place, which is the "Privacy Zone". Activating, by the electronic device 400, the privacy mode based on NFC tagging may be utilized not only in a building such as a conference room or a private office, but also in a transportation means such as a subway or a bus.

When there is no reliable device (a Bluetooth device or a Wi-Fi device) around, the electronic device 400 may determine whether the electronic device 400 is moving, based on the result of sensing context information (e.g., position information or activity information) of the electronic device 400, and when the electronic device 400 is moving, the electronic device 400 may activate the privacy mode. The context information may be position information based on global positioning system (GPS) information, or may include activity information obtained through at least one sensor (e.g., an acceleration sensor) of the electronic device. For example, in the environment in which GPS information is obtained, the electronic device 400 may determine that the electronic device 400 is moving through a transportation means (e.g., a bus or a taxi) even if there is no reliable device (a Bluetooth device or a Wi-Fi device) around, and may activate the privacy mode, based on the determination. Additionally or alternatively, when located in the indoor environment in which GPS information is not obtained, the electronic device 400 may activate the privacy mode, based on activity information obtained via at least one sensor (e.g., an acceleration sensor). The electronic device 400 may determine that the electronic device 400 is being move by a user who is walking, riding a bike, moving by subway, or being moved by car as activity information, based on information obtained from at least one sensor (e.g., an acceleration sensor). When the activity information is in a specific state (e.g., a user is moving by subway), the electronic device 400 may activate the privacy mode.

In step 520, the electronic device 400 determines the visual line of the user, based on the direction information of the electronic device 400. For example, the direction information of the electronic device 400 may include direction information about the direction of the front face of the display 405. When the electronic device 400 is in the fully unfolded state, the electronic device 400 may determine the direction information about the direction of the front face of the display 405, and may determine the visual line of the user, based on the determined direction information. For example, when the electronic device 400 is in the fully unfolded state, the electronic device 400 may determine the direction of the first face 211 or the third face 221, and may determine the visual line of the user, based on the determined direction of the first face 211 or the third face 221.

Figure 6:
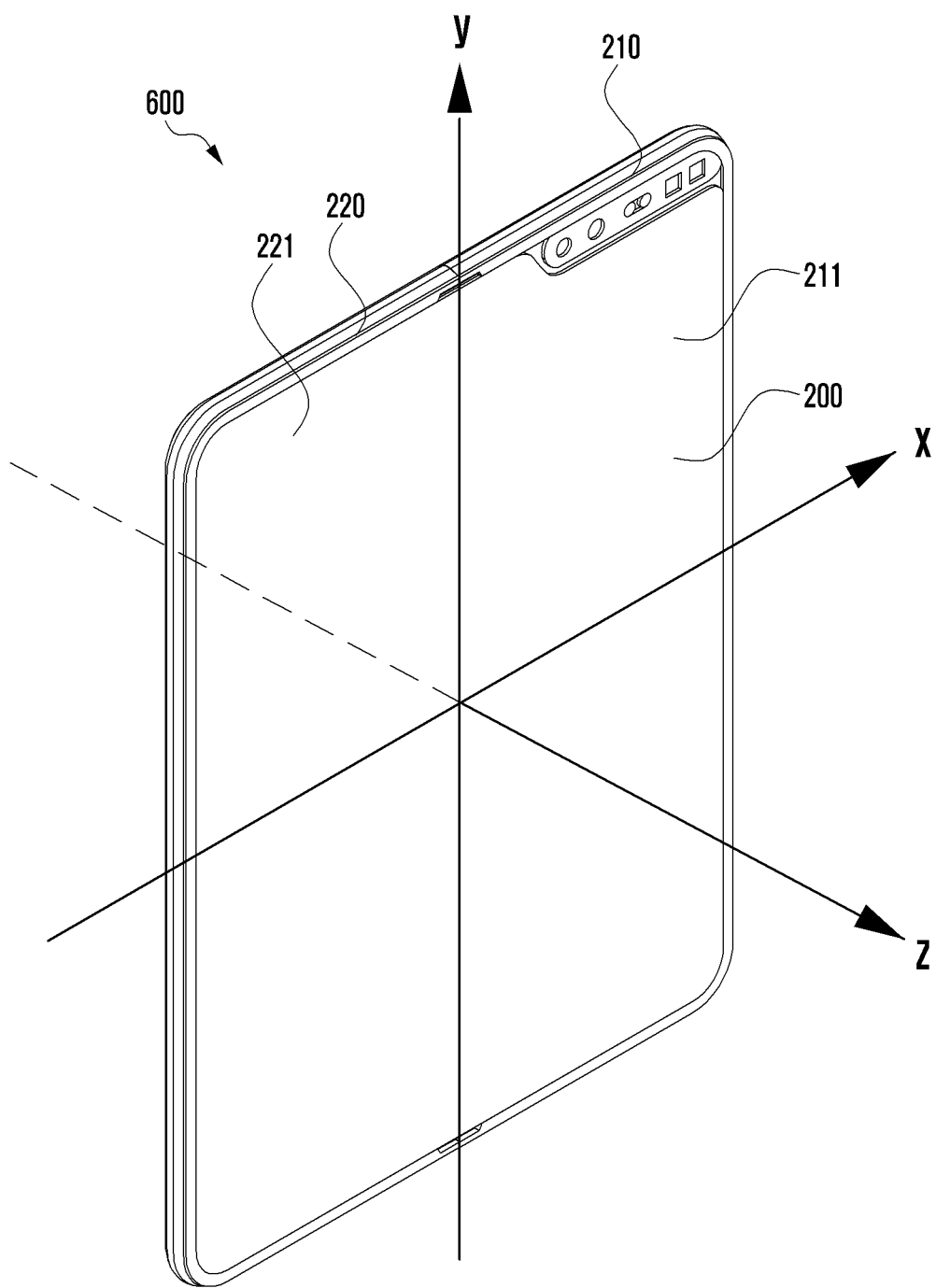
FIG. 6 is a view for describing an operation of determining a visual line of a user, according to an embodiment.

FIG. 6 is a view for describing an operation of determining a visual line of a user, according to an embodiment.

Referring to FIGS. 5 and 6, in step 520, when an electronic device 600 is fully unfolded, the electronic device 600 may perform authentication by obtaining biometric information (e.g., face information, iris information, or fingerprint information) of the user before a content is displayed on a display 200. For example, when the electronic device 600 is fully unfolded, the electronic device 600 may obtain face information (e.g., a face image) of the user via the front camera (e.g., the camera module 282 in FIG. 3), and may determine whether to authenticate, based on a result of comparing the obtained face information with previously stored data. When authentication of the user's biometric information (e.g., face information, iris information, or fingerprint information) succeeds in the fully unfolded state, the electronic device 600 may display a screen (or the user interface) including a content on the display 200, and may perform an operation of determining a visual line of the user, based on the direction information of the electronic device 600. The determination of the visual line of the user based on the direction information may be performed while the electronic device 600 performs the authentication or in response to the completion of the authentication. In determining the visual line of the user, the electronic device 600 may determine the direction information of the electronic device 600 based on the gravitational direction using a motion sensor 401, such as an acceleration sensor or a gyroscope while the electronic device is in the fully unfolded state. For example, the electronic device 600 may determine a direction in which the front face of the display 200 is oriented with respect to the direction of the first face 211 or the direction of the third face 221, and may determine the direction in which the front face of the display 200 is oriented with respect to the visual line of the user.

Using the motion sensor 401, the electronic device 600 may obtain, with reference to the gravity direction (e.g., the ground direction), x-axis information about a first direction oriented in the horizontal direction across the display 200, y-axis information about a second direction oriented in the vertical direction across the display 200 perpendicular to the first direction, and z-axis information about a third direction perpendicularly penetrating the display 200. For example, the electronic device 600 may determine that the z-axis information obtained using the motion sensor 401 is the direction of the visual line of the user.

In determining the visual line of the user for the first time, when the electronic device 600 is fully folded, the electronic device 600 may determine a direction perpendicular to the ground as the visual line of the user. For example, when the electronic device 600 is placed on a desk in the fully folded state, in determining the visual line of the user for the first time, a direction perpendicular to the ground may be determined as the visual line of the user.

Figure 7:
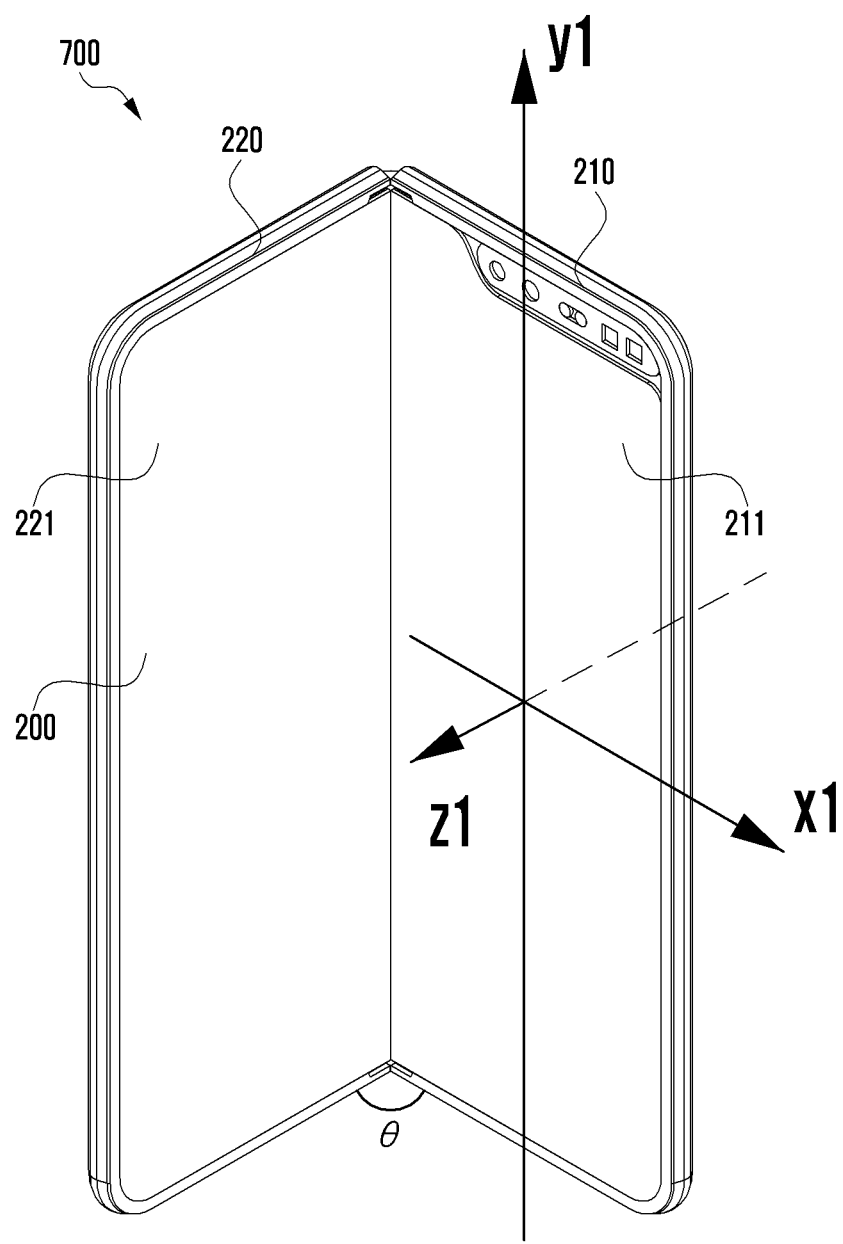
FIG. 7 is a view for describing an operation of determining the directions of a first face and a third face, according to an embodiment.

In step 530, when sensing the folding of the electronic device 600, the electronic device 600 senses a folded angle (e.g., the angle θ in FIG. 7). For example, the electronic device 600 may sense the folding of the electronic device 600 while displaying the content on the display 200 in the fully unfolded state. When sensing the folding, the electronic device 600 may determine the angle between the first housing 210 and the second housing 220. The electronic device 600 may calculate the angle formed between the first housing 210 and the second housing 220 using the angle sensor 402. The angle sensor 402 may be disposed in the hinge 264 of the electronic device 600 so as to calculate the angle formed between the first housing 210 and the second housing 220, and to transmit the calculated angle value to the processor 406. The angle sensor 402 may be a geomagnetic sensor, a gyro sensor, or an acceleration sensor embedded in each of the first housing 210 and the second housing 220. Sensors and methods for sensing the angle between the first housing 210 and the second housing 220 may be changed in various forms.

FIG. 7 is a view for describing an operation of determining the directions of the first face 211 and the third face 221, according to an embodiment.

Referring to FIGS. 5 and 7, in step 540, an electronic device 700 determines the direction of each face when the angle θ between the first housing 210 and the second housing 220 is determined. For example, the electronic device 700 may determine the directions of the first face 211 and the third face 221 on which a display 200 is disposed.

The electronic device 700 may include a first motion sensor embedded in the first housing 210, and may determine the direction of the first face 211 and the direction of the third face 221 using the first motion sensor. For example, as the operation of determining the directions of the first face 211 and the third face 221, the electronic device 700 may determine the direction of the first face 211 (e.g., the z direction illustrated in FIG. 7) using the first motion sensor, and may determine the direction of the third face 221 based on the direction of the first face 211 (e.g., the z1 direction illustrated in FIG. 7) and the angle between the first housing 210 and the second housing 220 (e.g., θ illustrated in FIG. 7).

Figure 8:
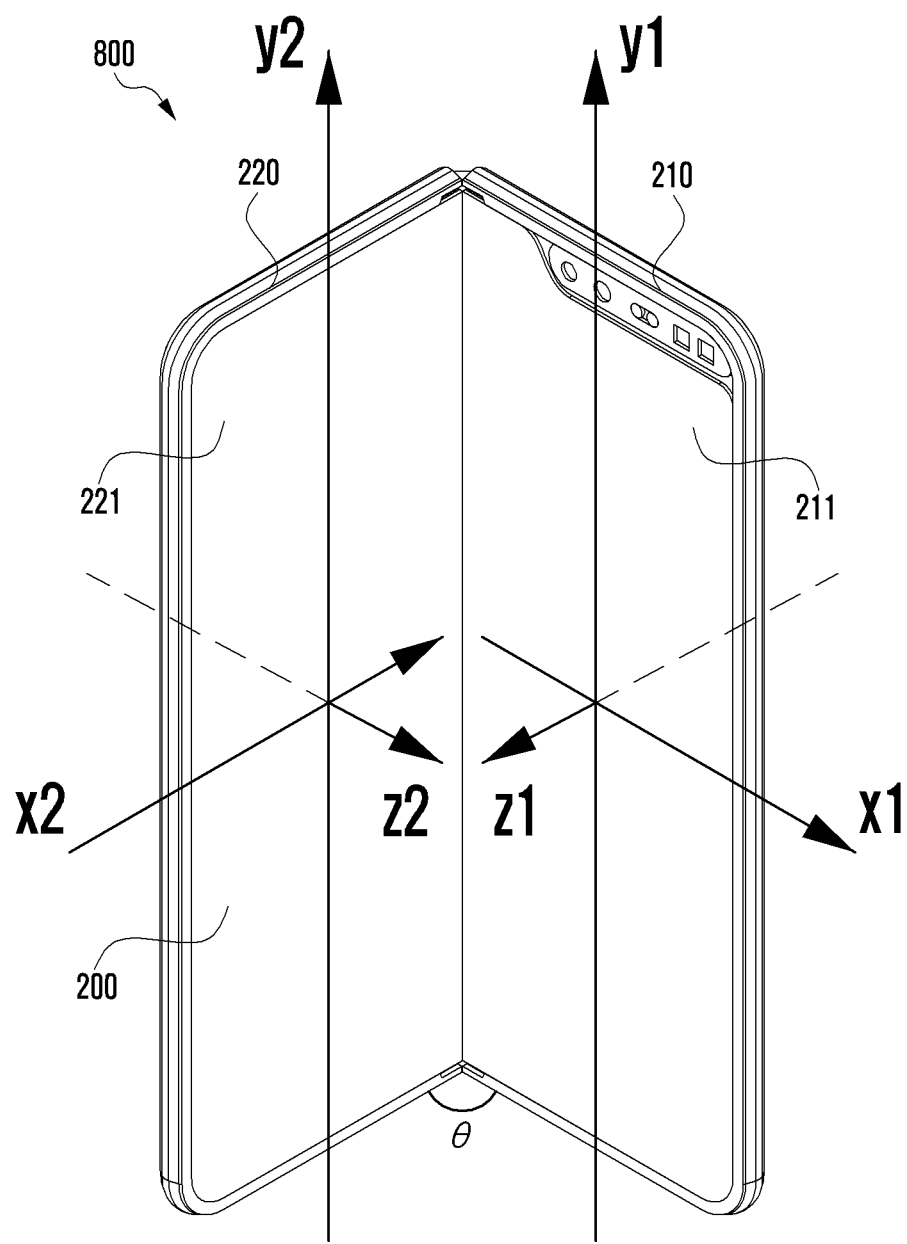
FIG. 8 illustrates in which a motion sensor is provided in each of the first housing and the second housing, according to an embodiment.

FIG. 8 is a view for describing an operation of determining the directions of the first face 211 and the third face 221, according to an embodiment.

Referring to FIGS. 5 and 8, in step 540, the electronic device 800 includes a first motion sensor 401 embedded in each of the first housing 210 and the second housing 220, and may determine the direction of the first face 211 and the direction of the third face 221 using each of the motion sensors. For example, the electronic device 800 may include a first motion sensor embedded in the first housing 210 and a second motion sensor embedded in the second housing 220, and may determine the direction of the first face 211 and the direction of the third face 221 using the first motion sensor and the second motion sensor. For example, as the operation of determining the directions of the first face 211 and the third face 221, the electronic device 400 may determine the direction of the first face 211 (e.g., the z1 direction illustrated in FIG. 8) using the first motion sensor, and may determine the direction of the third face 221 (e.g., the z2 direction illustrated in FIG. 8) using the second motion sensor. The first motion sensor and the second motion sensor may be the same or similar sensors. For example, the first sensor and the second sensor may be at least one of a geomagnetic sensor, a gyro sensor, or an acceleration sensor.

Figure 9:
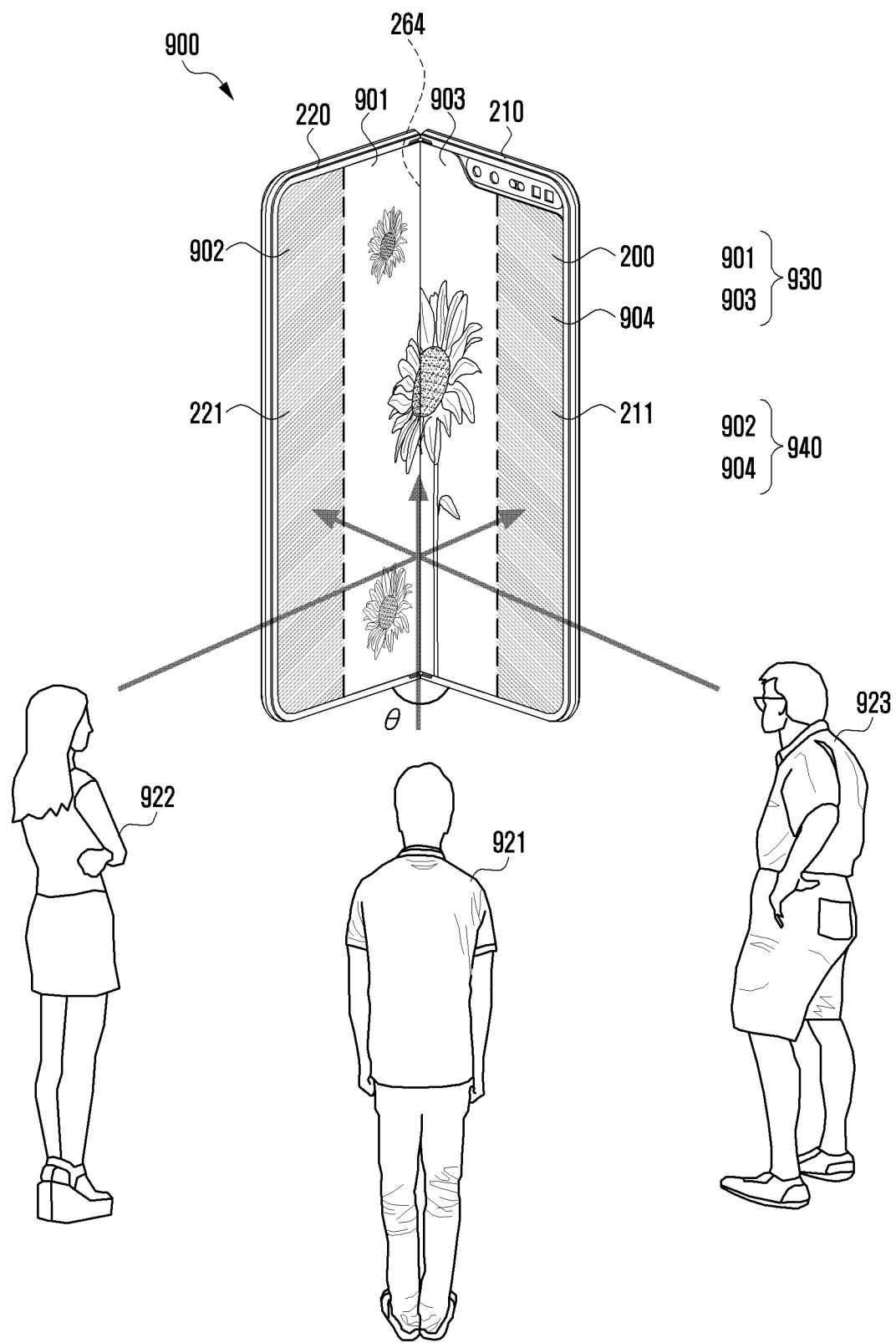
FIG. 9 is a view illustrating the state in which the position of a content displayed on a display is adjusted, according to an embodiment.

FIG. 9 is a view for describing an operation of determining the position of a content displayed on the display 200, according to an embodiment.

Referring to FIGS. 5 and 9, in step 550, an electronic device 900 determines one of the position or the size of a content displayed on the display 200 based on the determined direction of each face or visual line, and may display the content at the determined position. For example, the electronic device 900 may determine at least one of the position or the size of the content displayed on the display 200, based on at least one of the visual line of a user, the direction of the first face 211, or the direction of the third face 221.

Based on at least one of the visual line of the user, the direction of the first face 211, or the direction of the third face 221, the electronic device 900 may estimate which portion of the screen of the folded display 200 will focus on. For example, as illustrated in FIG. 9, when the first housing 210 and the second housing 220 are folded so as to form a specific angle therebetween, the electronic device 900 may estimate that a first user 921 who owns the electronic device 900 is positioned in the direction of the previously determined visual line, may determine a region of the display 200 that is expected to be relatively visible from the estimated position of the first user 921 as a display region, and may determine a remaining region of the display 200 as a non-display region 940.

The electronic device 400 determines a region of the display 200 that is expected to be relatively visible from the estimated position of the first user 921, on the premise that, when the electronic device 400 is in the folded state, a second user 922 (e.g., a first stranger) positioned on the left of the estimated position of the first user 921 (e.g., the direction of the visual line) may gaze directly at the first face 211 and a third user 923 (e.g., a second stranger) positioned on the right of the position of the first user 921 (e.g., the direction of the visual line) may gaze directly at the third face 221. For example, the electronic device 400 may control a region outside the first face 211 that is easy for the second user 922 to gaze at, as the non-display region 940 of the display 200, and may control a region outside the third face 221 that is easy for the third user 923 to gaze at, as the non-display region 940 of the display 200.

Additionally or alternatively, the electronic device 400 may control a region relatively far from the hinge 264 in the first face 211 as a first non-display region 904, and may control a region relatively close to the hinge 264 in the first face 211 as a first display region 903. In addition, the electronic device 400 may control a region relatively far from the hinge 264 in the third face 221 as a second non-display region, and may control a region relatively close to the hinge 264 in the third face 221 as a second display region 901. The electronic device 400 may control the first display region 903 and the second display region 901 to be connected to each other at a portion overlapping the hinge 264, and may cause a content to be displayed on the first display region 903 and the second display region 901. Accordingly, the first user 921 is capable of easily staring at the content displayed on the first display region 903 and the second display region 901, while the second user 922 and the third user 923 are not easily capable of staring at the content, thereby enhancing privacy protection. Depending on the angle θ between the first housing 210 and the second housing 220, the electronic device 900 may adjust the size or position of the display region 930 and the size or position of the non-display region 940.

Figure 10A:
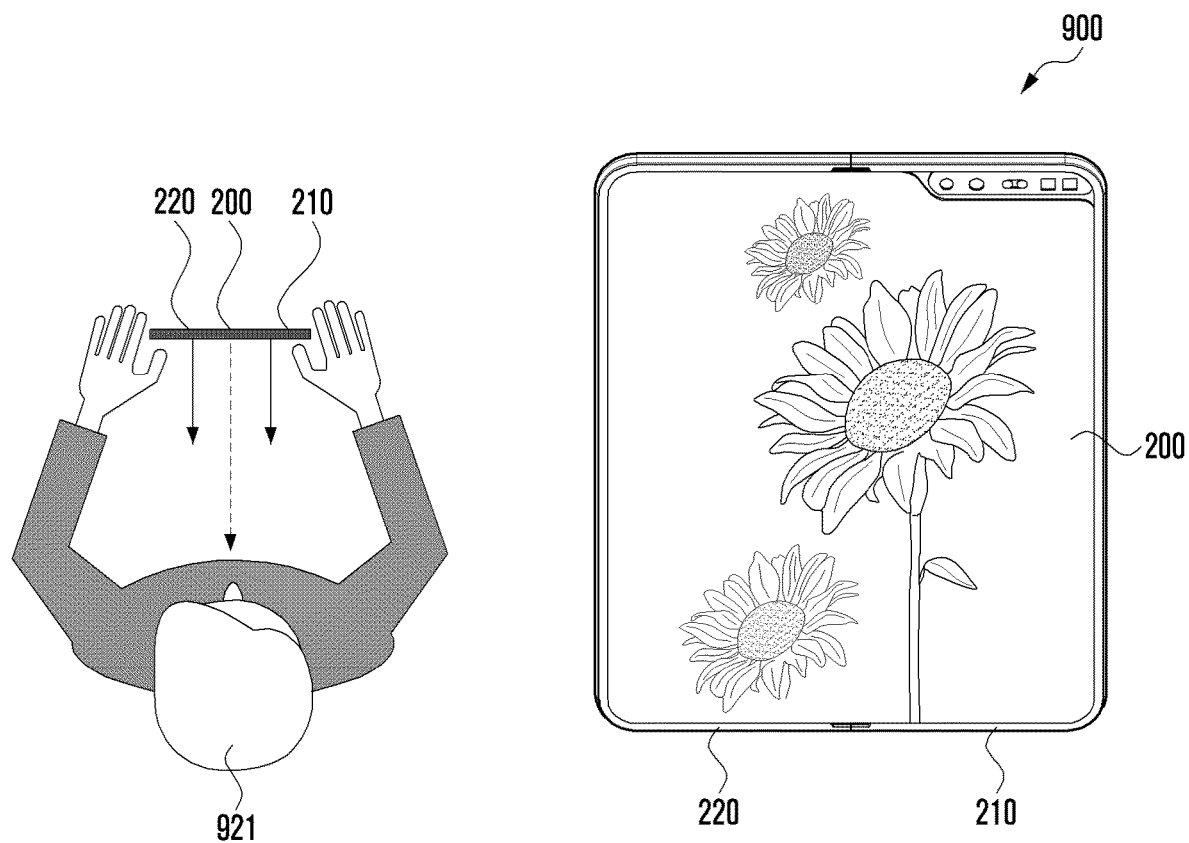
FIG. 10A is a view illustrating a method of adjusting a position of the display region, based on an angle at which the first housing and the second housing are folded, according to an embodiment.
Figure 10B:
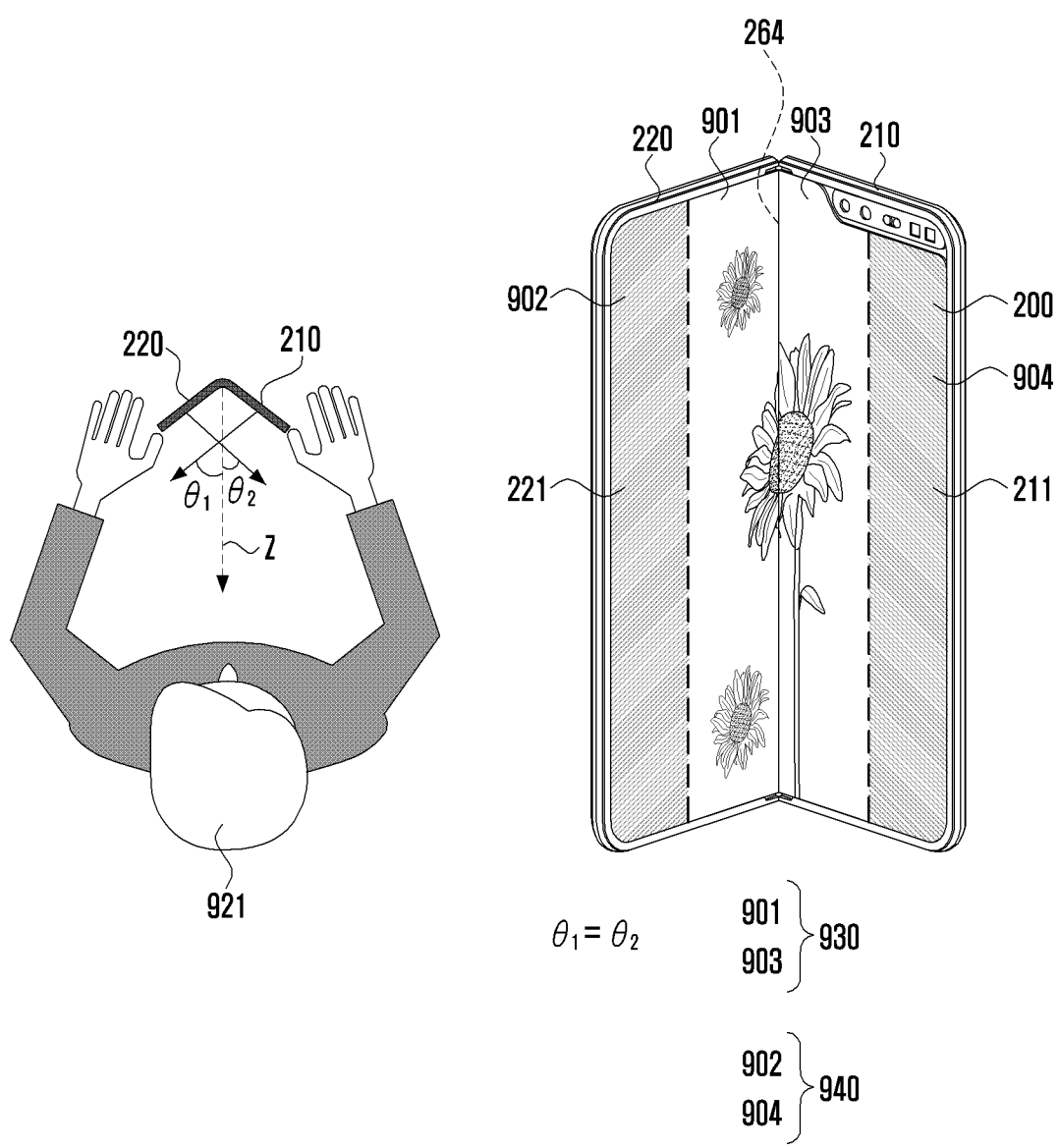
FIG. 10B is a view illustrating a method of adjusting a position of the display region, based on an angle at which the first housing and the second housing are folded, according to an embodiment.
Figure 10C:
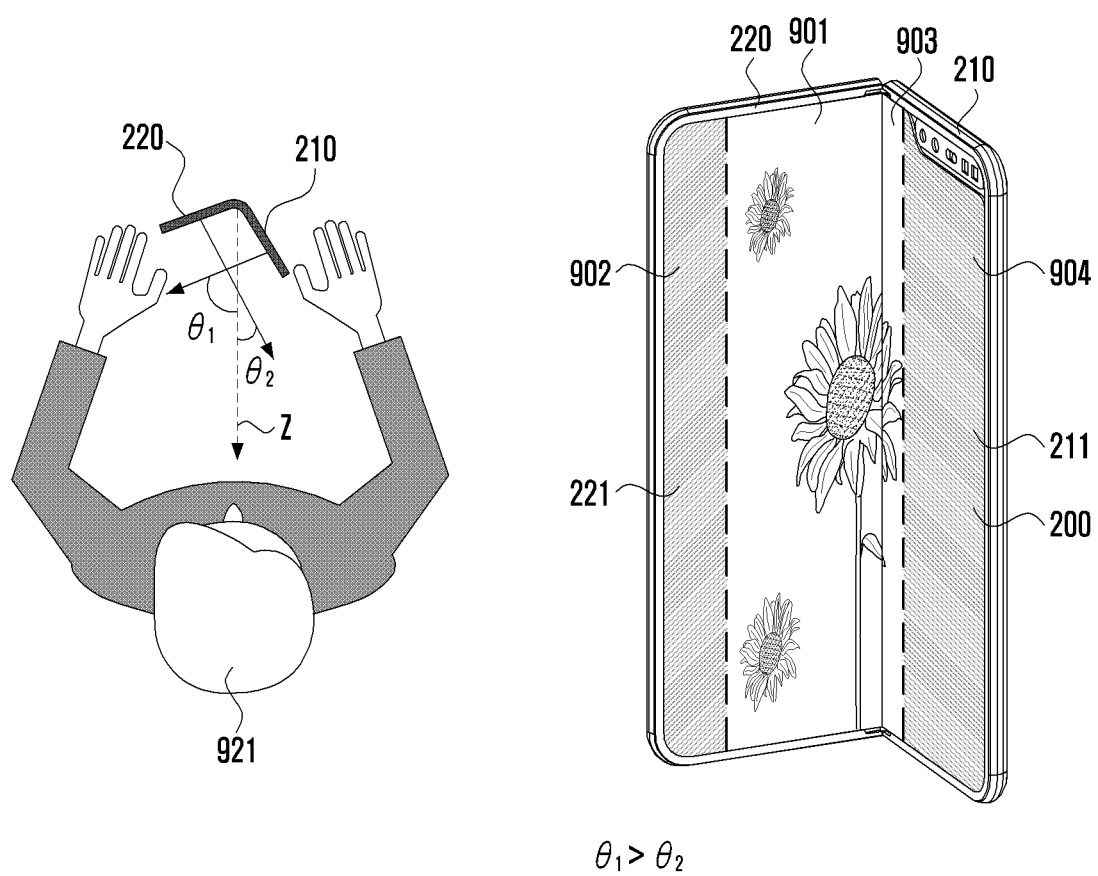
FIG. 10C is a view illustrating a method of adjusting a position of the display region, based on an angle at which the first housing and the second housing are folded, according to an embodiment.
Figure 10D:
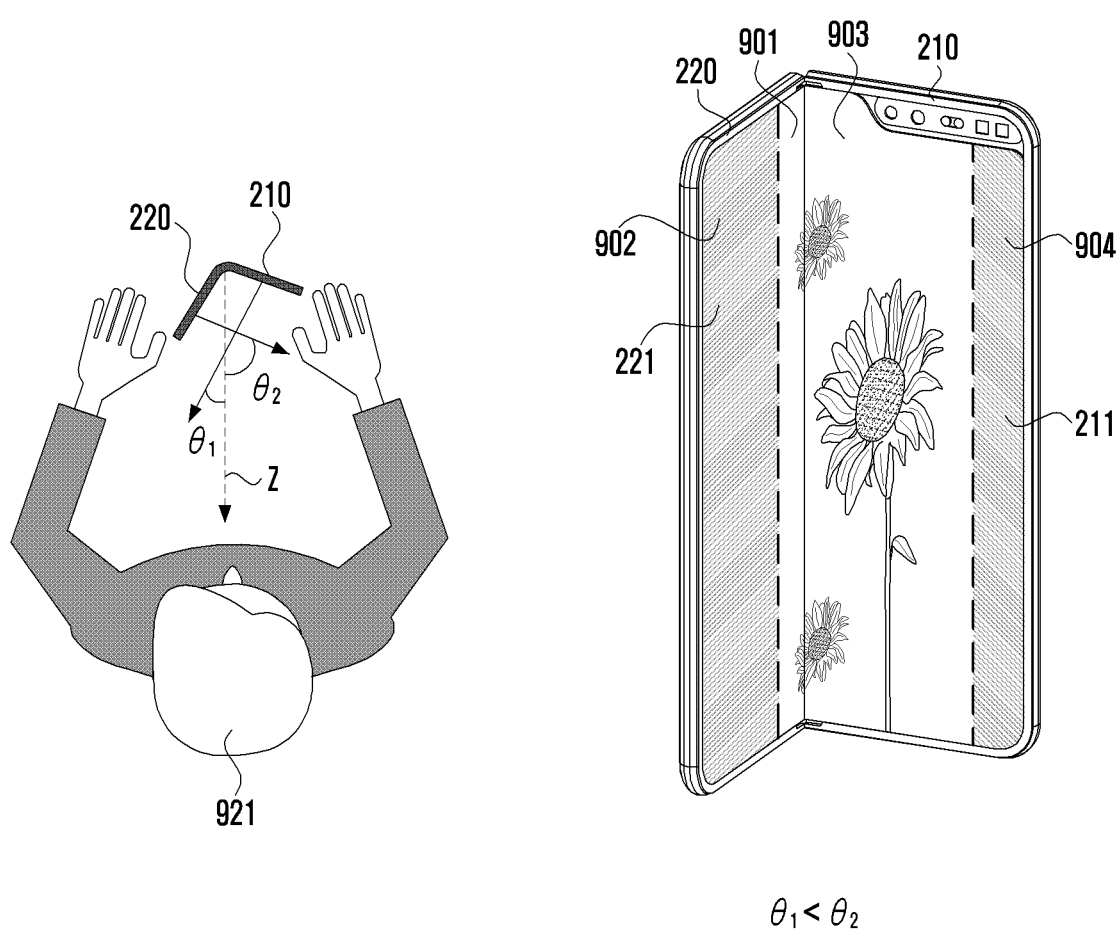
FIG. 10D is a view illustrating a method of adjusting a position of the display region, based on an angle at which the first housing and the second housing are folded, according to an embodiment.

FIG. 10A is a view illustrating a method of adjusting a position of the display region, based on an angle at which the first housing 210 and the second housing 220 are folded, according to an embodiment. FIG. 10B is a view illustrating a method of adjusting a position of the display region, based on an angle at which the first housing 210 and the second housing 220 are folded, according to an embodiment. FIG. 10C is a view illustrating a method of adjusting a position of the display region, based on an angle at which the first housing 210 and the second housing 220 are folded, according to an embodiment. FIG. 10D is a view illustrating a method of adjusting a position of the display region, based on an angle at which the first housing 210 and the second housing 220 are folded, according to an embodiment.

The position of the display region 930 may be determined based on a first angle θ1 in which the direction of the first face 211 is inclined with respect to the visual line z and a second angle θ2 in which the direction of the third face 221 is inclined with respect to the visual line z. A method of determining the position of the display region 930 by the electronic device 900 is described below.

Upon being switched from the state illustrated in FIG. 10A to the state illustrated FIG. 10B, since the first angle θ1 and the second angle θ2 are the same, the first housing 210 and the second housing 220 may be folded at the same angle in the process of switching the electronic device 900 from the unfolded state to the folded state. Thus, when the first angle θ1 and the second angle θ2 are the same, the electronic device 900 may determine the center portion of the display 200 as the display region 930, and may control the display region 930 to be symmetric about the hinge 264.

Upon being switched from the state illustrated in FIG. 10A to the state illustrated in FIG. 10C, the first angle θ1 being greater than the second angle θ2 may mean that the first housing 220 is folded more than the second housing 220 during switching of the electronic device 900 from the unfolded state to the folded state. This may mean that the first user 921 who owns the electronic device 900 gazes more at the third face 221 than at the first face 211. Thus, when the first angle θ1 is greater than the second angle θ2, the electronic device 900 may control the display region 930 to be asymmetric with respect to the hinge 264, and may control the display region 930 to be biased to the third face 221. The electronic device 900 may perform control such that the area of the second display region 901 disposed on the third face 221 becomes greater than the area of the first display region 903 disposed on the first face 211. Accordingly, the second user 922 positioned on the left of the first user 921 may not easily view the content even when staring at the first face 211, and the third user 923 positioned on the right of the first user 921 may not easily view the first face 211 due to the first housing 210 being folded.

Upon being switched from the state illustrated in FIG. 10A to the state illustrated in FIG. 10D, since the second angle θ2 is greater than the first angle θ1, the second housing 220 may be folded more than the first housing 210 in the process of switching the electronic device 900 from the unfolded state to the folded state, and the first user 921 who owns the electronic device 900 may gaze more at the first face 211 than at the third face 221. Thus, when the second angle θ2 is greater than the first angle θ1, the electronic device 900 may control the display region 930 to be asymmetric with respect to the hinge 264, and may control the display region 930 to be biased to the first face 211. For example, the electronic device 900 may perform control such that the area of the first display region 903 disposed on the first face 211 becomes greater than the area of the second display region 901 disposed on the third face 221. Accordingly, the third user 923 positioned on the right of the first user 921 may not easily view the content even when staring at the third face 221, and the second user 922 positioned on the left of the first user 921 may not easily view the first face 211 due to the second housing 220 being folded.

Based on the folded angle between the first housing 210 and the second housing 220, the electronic device 900 may adjust the area of the display region 930, the size of a displayed area or the content. For example, the electronic device 900 may reduce the area of the display region 930 and the size of the content up to 50% of the entire area of the display 200 in proportion to the folded angle between the first housing 210 and the second housing 220. When the folding operation is detected while displaying the content in the fully unfolded state, the electronic device 900 may estimate that the user wants privacy protection. In addition, as the folded angle between the first housing 210 and the second housing 220 increases, the electronic device 900 may estimate that the user wants more privacy protection. When the electronic device 900 is switched from the state in which the area of the display region 930 and the size of the content are reduced into the state in which the electronic device 900 is unfolded, the electronic device 900 may control the entire area of the display 200 as the display region 930, and the privacy mode may be terminated.

Figure 11:
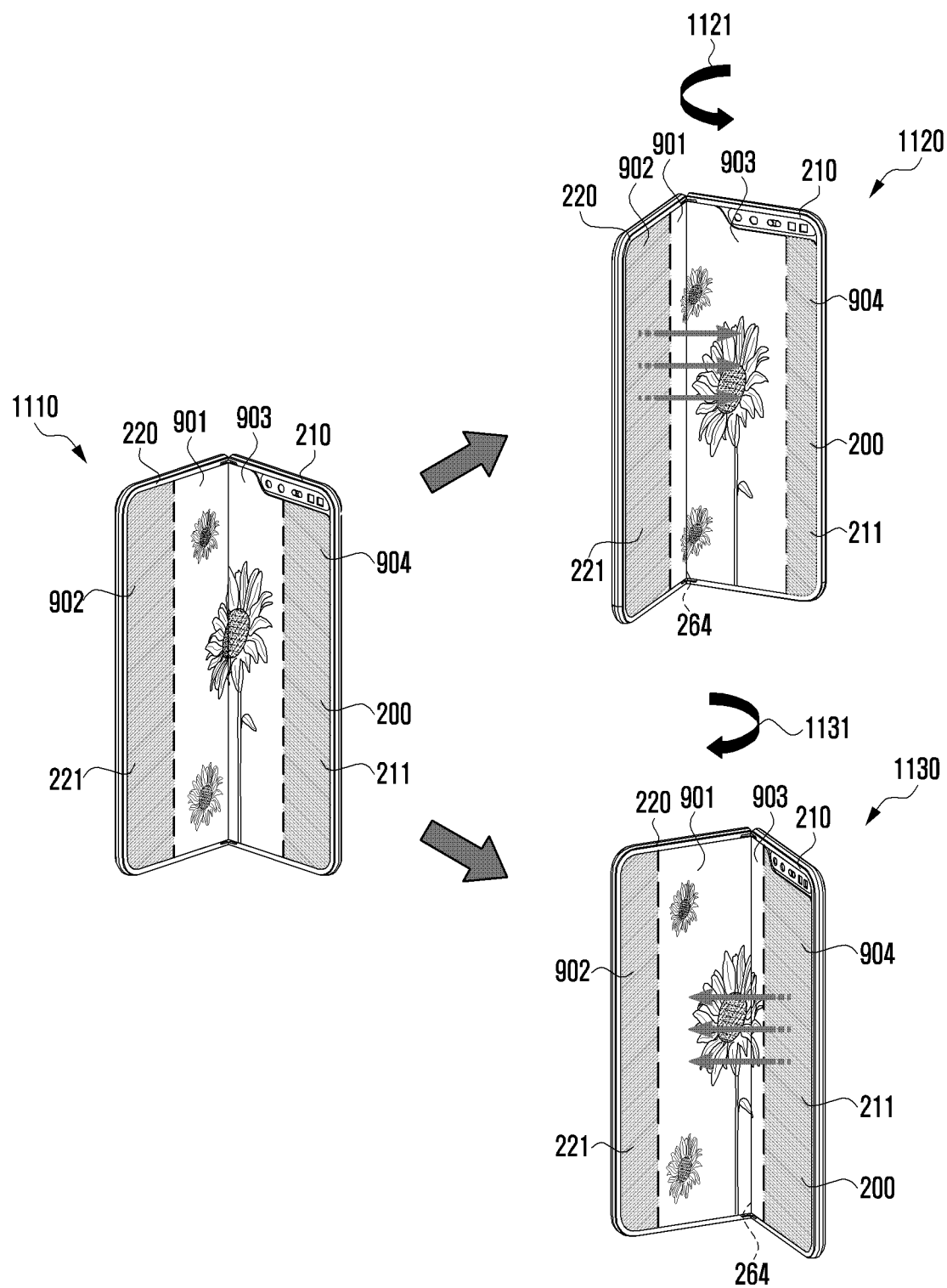
FIG. 11 is a view for describing an operation of readjusting the position of a content displayed on a display, based on sensing of a rotation of the electronic device, according to an embodiment.

FIG. 11 is a view for describing an operation of adjusting the position of a content displayed on a display 200, based on sensing a rotation of the electronic device 900, according to an embodiment.

Referring to FIGS. 5 and 11, in step 560, when the electronic device 900 senses the rotation of the electronic device 900 while the content is being displayed on a portion of the display 200 in the folded state (e.g., while step 550 is being performed).

The electronic device 900 may sense the rotation of the electronic device 900 using the first motion sensor embedded in the first housing 210. Additionally or alternatively, the electronic device 900 may sense the rotation of the electronic device 900 using at least one of the first motion sensor embedded in the first housing 210 or the second motion sensor embedded in the second housing 220.

When the electronic device 900 rotates, the electronic device 900 may adjust the position of the content, based on the sensed rotation direction. For example, the electronic device 900 may re-determine the directions of the first face 211 and the third face 221, and may adjust the position of the display region or the position of the content, based on the re-determined directions of the first face 211 and the third face 221.

Figure 12:
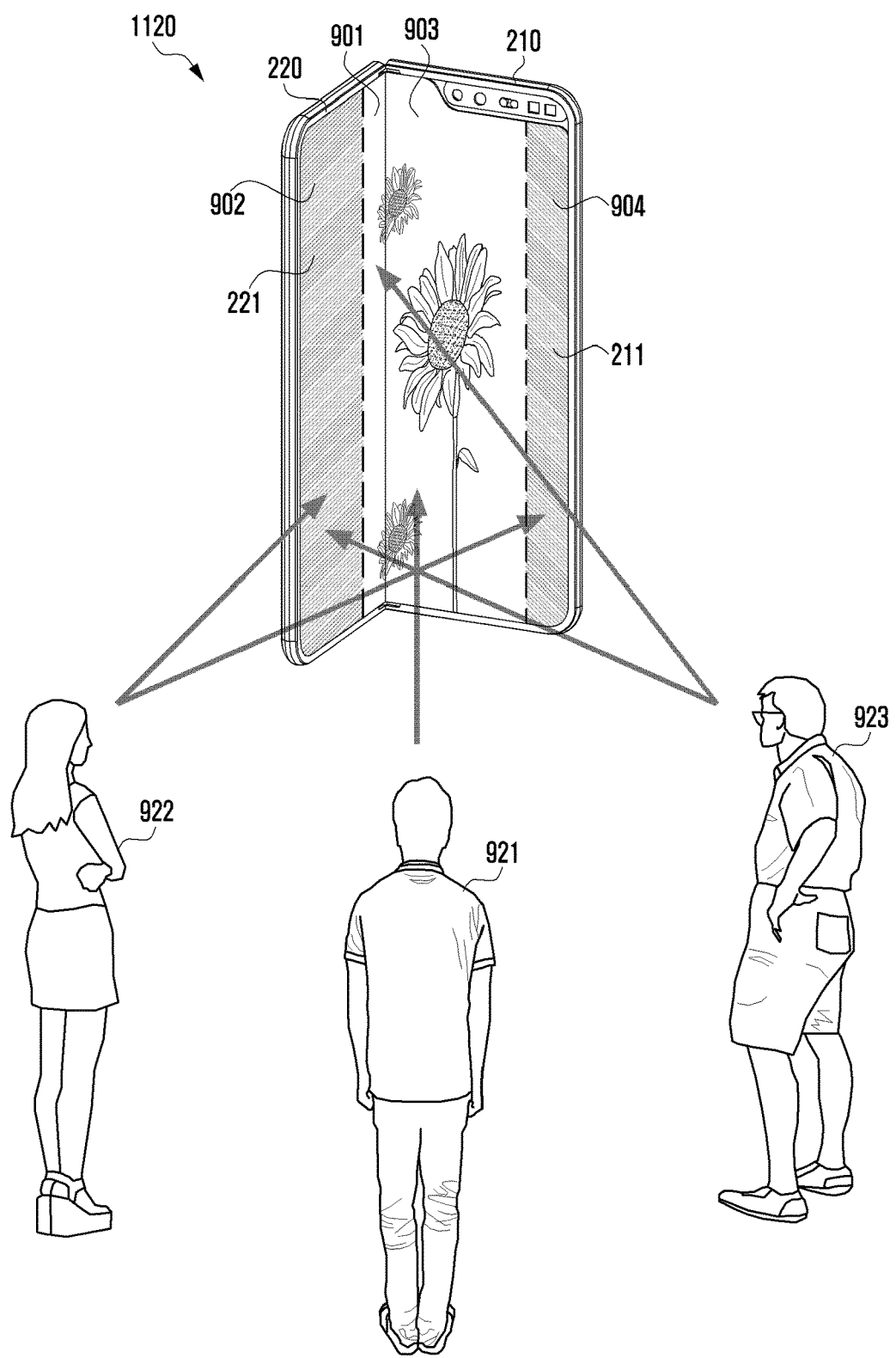
FIG. 12 is a view illustrating movement of a content when the electronic device is rotated counterclockwise about the hinge, according to an embodiment.

Assuming that the first face 211 is disposed on the right side of the third face 221 when the display 200 is viewed from above, when the electronic device 900 is rotated in the counterclockwise direction 1121 about the hinge 264 (e.g., when switched from the state 1110 to the state 1120 in FIG. 11), the electronic device 900 may move the content displayed on the display region in the third direction from the third face 221 toward the first face 211. For example, the display 200 may include a first portion located on one side of the hinge 264 and a second portion located on the other side of the hinge 264. When the display 200 is viewed from above, the first portion may be disposed on the right side of the second portion, and the third direction may be a direction from the second portion of the display 200 toward the first portion of the display 200. As illustrated in FIG. 12, when the electronic device 900 rotates in the counterclockwise direction 1121 about the hinge 264 (e.g., when switched to the state 1120 in FIG. 11), the first user 921 who owns the electronic device 900 is exposed more to the first face 211 than to the third face 221. Thus, when the electronic device 900 rotates in the counterclockwise direction 1121 about the hinge 264, the electronic device 900 may move the content in the third direction. For example, the electronic device 900 may control the display region 930 to be asymmetric with respect to the hinge 264, and may control the display region 930 to be biased to the first face 211. Additionally or alternatively, the electronic device 900 may perform control such that the area of the first display region 903 disposed on the first face 211 becomes greater than the area of the second display region disposed on the third face 221. Accordingly, the third user 923 positioned on the right of the first user 921 may not easily view the content even when staring at the third face 221, and the second user 922 positioned on the left of the first user 921 may not be able to easily view the first face 211 since it will appear covered by the second housing 220.

Figure 13:
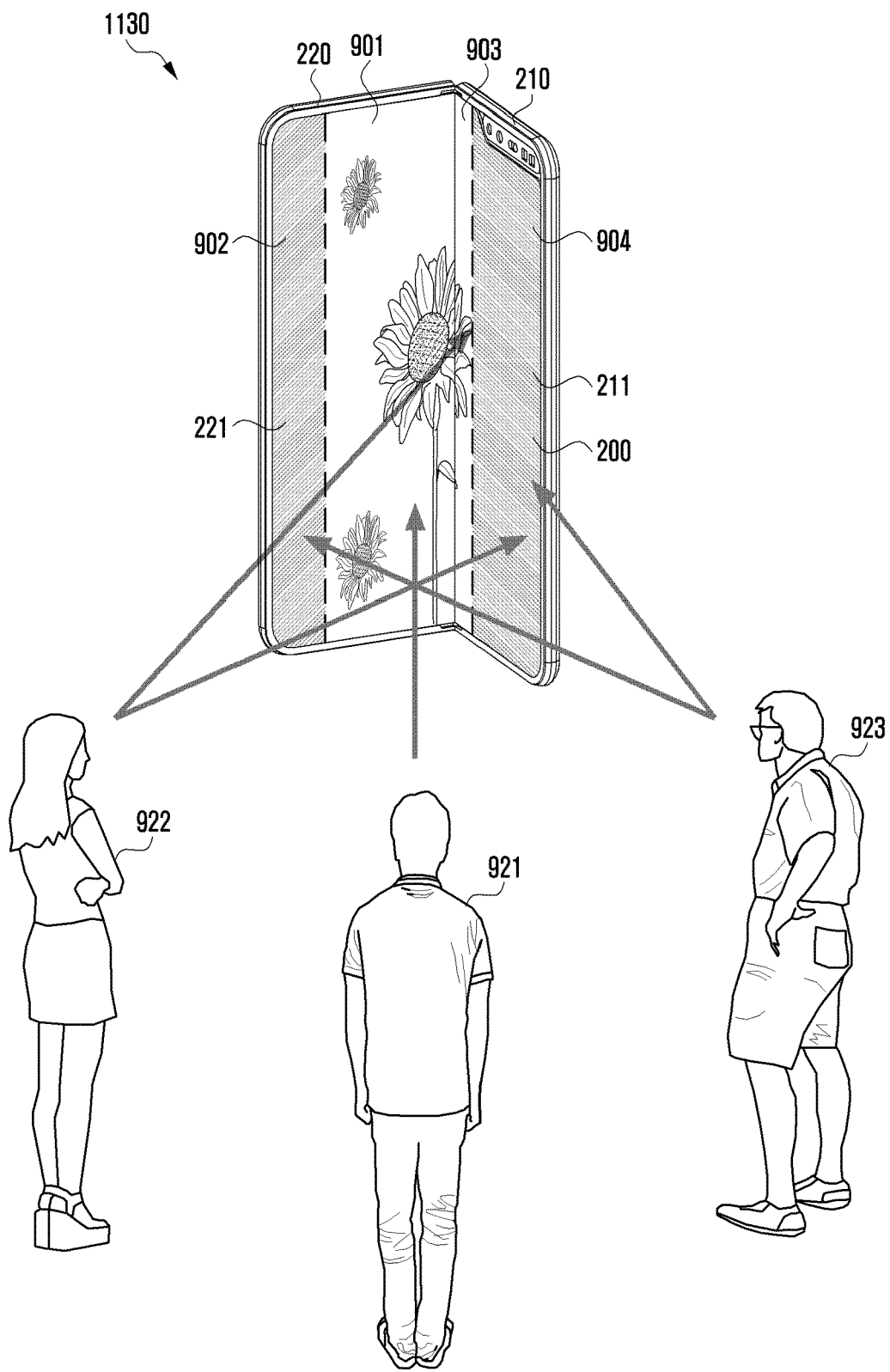
FIG. 13 is a view illustrating movement of a content when the electronic device is rotated clockwise about the hinge, according to an embodiment.

Assuming that the first face 211 is disposed on the right side of the third face 221 when the display 200 is viewed from above, when the electronic device 900 is rotated in the clockwise direction 1131 about the hinge 264 (e.g., when switched from the state 1110 to the state 1130 in FIG. 11), the electronic device 900 may move the content displayed on the display region in the fourth direction from the first face 211 toward the third face 221. For example, the fourth direction may be a direction from the first portion of the display 200 toward the second portion of the display 200. As illustrated in FIG. 13, when the electronic device 900 rotates in the clockwise direction 1131 about the hinge 264 (e.g., when switched to the state 1130 in FIG. 11), the first user 921 who owns the electronic device 900 may be capable of staring more at the third face 221 than at the first face 211. Thus, when the electronic device 900 rotates in the clockwise direction 1131 about the hinge 264, the electronic device 900 may move the content in the fourth direction. For example, the electronic device 900 may control the display region to be asymmetric with respect to the hinge 264, and may control the display region to be biased to the third face 221. Additionally or alternatively, the electronic device 900 may perform control such that the area of the second display region disposed on the third face 221 becomes greater than the area of the first display region 903 disposed on the first face 211. Accordingly, the second user 922 positioned on the left of the first user 921 may not easily view the content even when staring at the first face 211, and the second user 923 positioned on the right of the first user 921 may not be able to easily gaze at the first face 211 since the first housing 210 is covered.

When the electronic device 900 does not sense the rotation of the electronic device 900 while the content is being displayed on a portion of the display 200 in the folded state (e.g., while step 550 is being performed), step 560 may be omitted.

Figure 14:
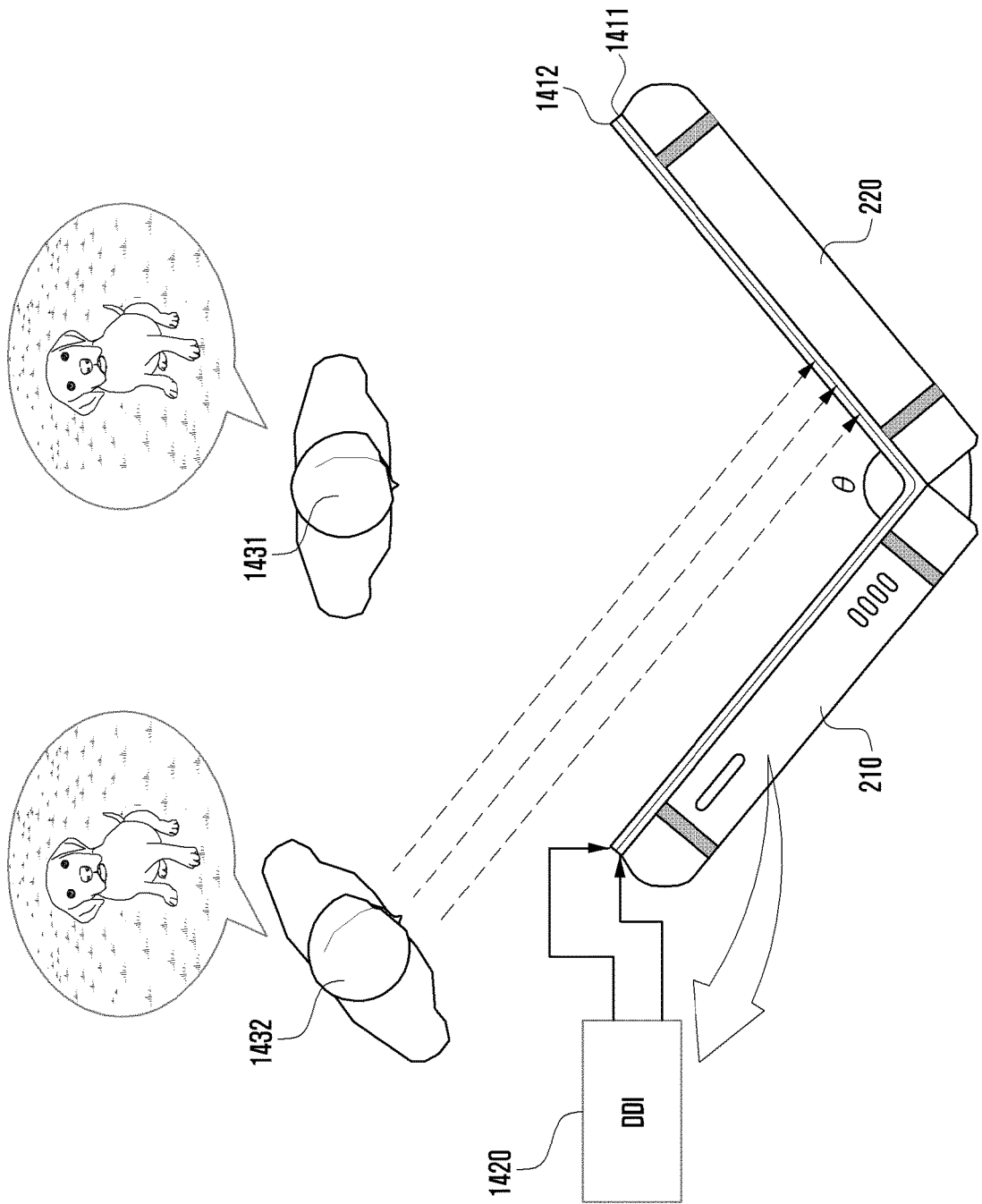
FIG. 14 is a view illustrating the state in which a switchable barrier is deactivated, according to an embodiment.
Figure 15:
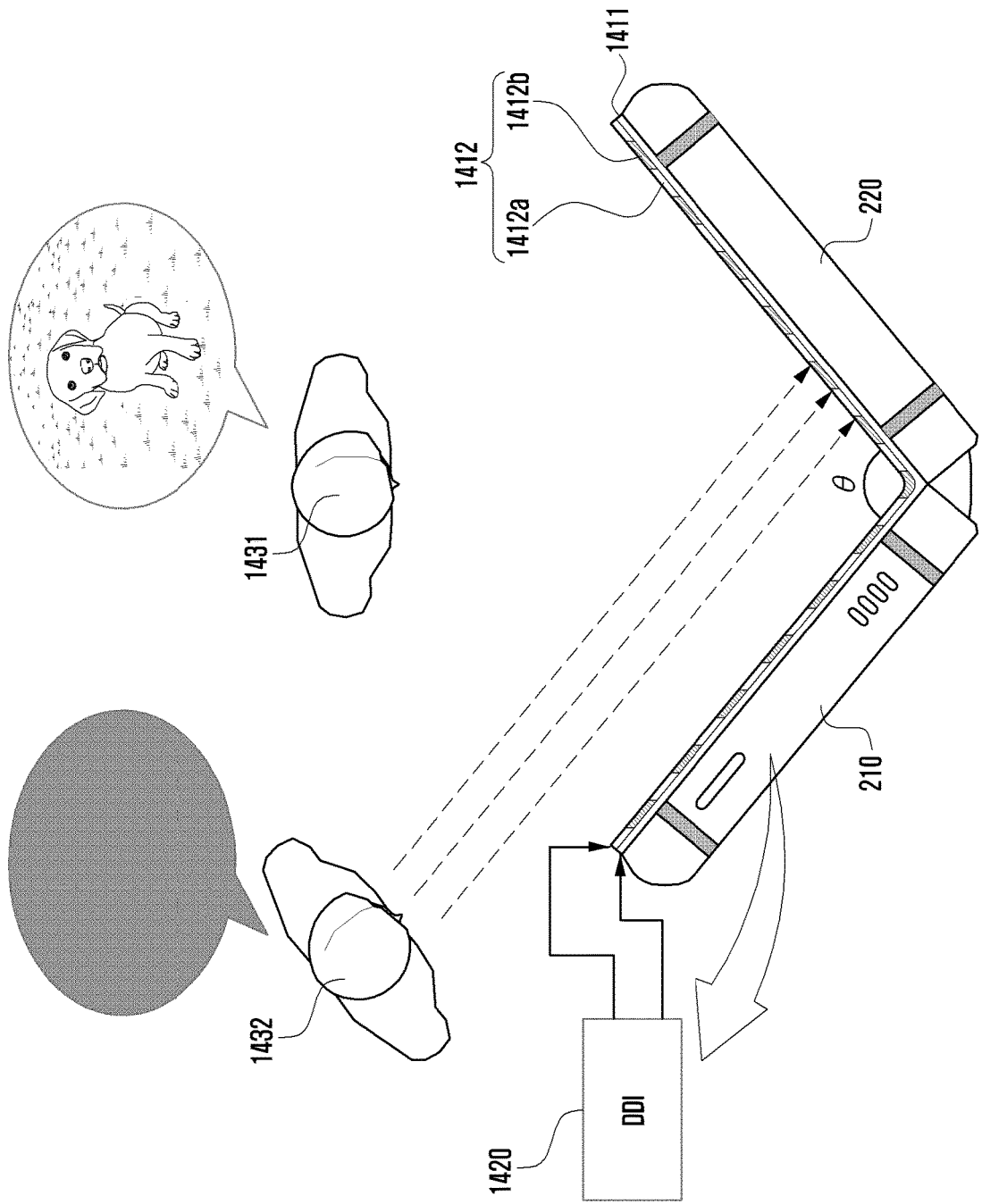
FIG. 15 is a view illustrating the state in which the switchable barrier is activated, according to an embodiment.

FIG. 14 is a view illustrating the state in which a switchable barrier is deactivated, according to an embodiment. FIG. 15 is a view illustrating the state in which the switchable barrier is activated, according to an embodiment.

A switchable barrier 1412 is formed on the display 1411, and a plurality of barriers and a plurality of slits may be formed depending on the privacy mode.

Referring to FIG. 14, in the state in which the privacy mode of the electronic device 900 is released (i.e., less secure mode), the switchable barrier 1412 may be deactivated, and the switchable barrier 1412 may transmit light in all directions output through the display 1411. For example, in the deactivated state, the switchable barrier 1412 may transmit all the contents displayed on the display 1411. Accordingly, since the switchable barrier 1412 is deactivated when the privacy mode of the electronic device 900 is released, the content displayed on the display 1411 may be visible to the first user 1431 positioned in front of the display 1411, as well as to another user 1432 (e.g., the second user 922 or the third user 923 illustrated in FIG. 9) positioned in the vicinity of the first user 1431.

Referring to FIG. 15, in the privacy mode (i.e., more secure mode) of the electronic device 900, the switchable barrier 1412 may be activated, and the switchable barrier 1412 may form a plurality of slits 1412a and a plurality of barriers 1412b, based on a control signal from a DDI 1420. The switchable barrier 1412 may alternately form the plurality of slits 1412a and the plurality of barriers 1412b, based on the control signal of the DDI 404. The plurality of barriers 1412b may block light that is output from the front face of the display 1411 at a predetermined angle or more, among the light output through the display 1411, and the plurality of slits 1412a may transmit light that is output within the predetermined angle from the front face of the display 1411, among the light output through the display 1411. In the privacy mode of the electronic device 900, the switchable barrier 1412 blocks light output from the front face of the display 1411 at an angle greater than or equal to a predetermined angle. Thus, the content displayed on the display 1411 may be visible only to the first user 1431 positioned in front of the display 1411, and may not be visible to another user 1432 positioned in the vicinity of the first user 1431.

When the privacy mode is activated, the electronic device 900 may activate the switchable barrier 1412, and may form a plurality of barriers 1412b so as to overlap a region of the display 1411, based on a predetermined condition. For example, when the direction of the first face 211 and the direction of the third face 221 are determined using the motion sensor 401 as in step 540 of FIG. 5, the electronic device 900 may determine the position of the content displayed on the display 1411, based on the determined direction of each face or the visual line, and may form a plurality of barriers 1412b in a region overlapping a region of the display 1411 such that the content is not visible in the direction of the first face 211 (e.g., from the position of the second user 922 illustrated in FIG. 9) or the direction of the third face 221 (e.g., from the position of the third user 923 illustrated in FIG. 9). When the rotation of the electronic device 900 is sensed as in step 560 in FIG. 5, the electronic device 900 may maintain the privacy protection function by dynamically adjusting the positions at which the barriers 1412b are formed.

Figure 16:
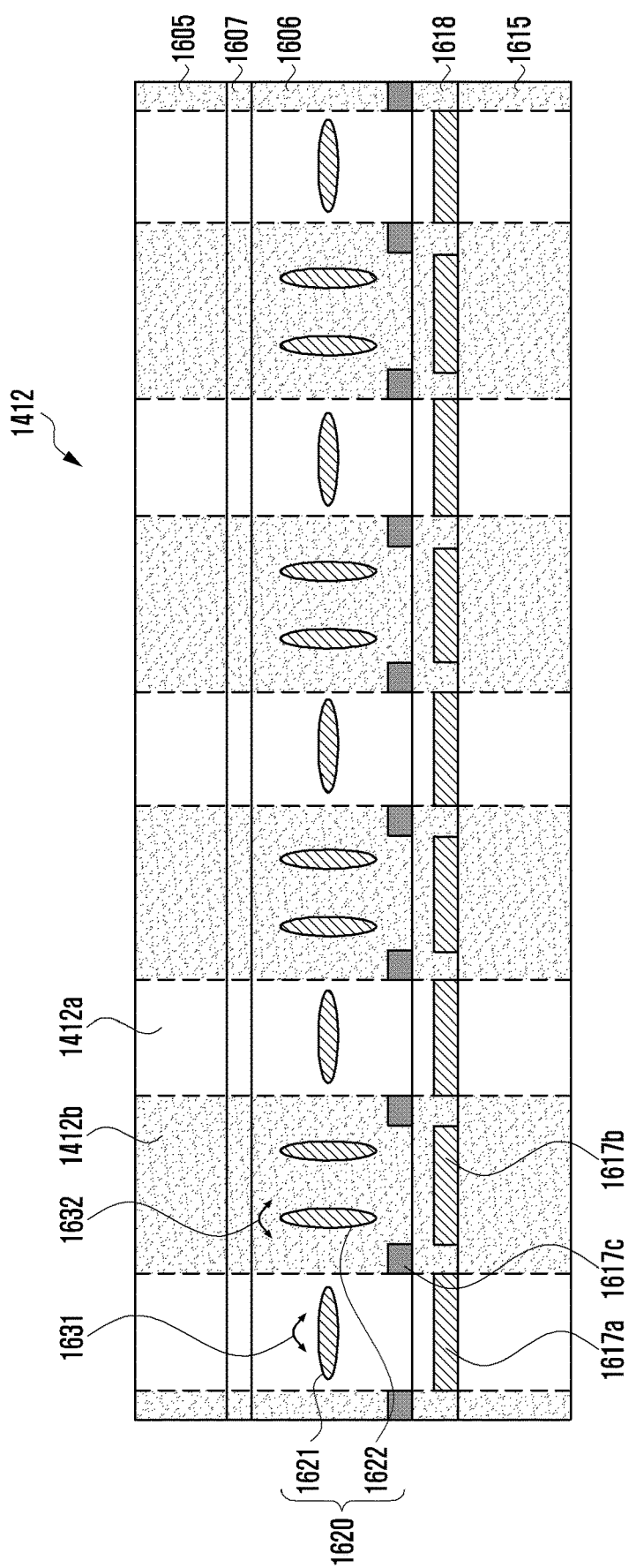
FIG. 16 is a cross-sectional view of the switchable barrier, according to an embodiment.

FIG. 16 is a cross-sectional view of the switchable barrier, according to an embodiment.

Referring to FIG. 16, a switchable barrier 1412 includes a first substrate 1615 (e.g., a lower substrate), a second substrate 1605 facing the first substrate 1615, a liquid crystal layer 1606 formed between the first substrate 1615 and the second substrate 1605, an insulating layer 1618 formed between the liquid crystal layer 1606 and the first substrate 1615, or a common electrode 1607 formed between the second substrate 1605 and the liquid crystal layer 1606.

A plurality of lower electrodes 1617a and 1617b may be formed on the first substrate 1615 at predetermined intervals, and the insulating layer 1618 may be formed on the first substrate 1615 on which the plurality of lower electrodes 1617a and 1617b are formed. A plurality of upper electrodes 1617c may be formed on the insulating layer 1618 at predetermined intervals.

The liquid crystal layer 1606 may include a plurality of liquid crystals 1620, and the plurality of liquid crystals 1620 may be tilted at a predetermined angle by applying a predetermined voltage to the plurality of lower electrodes 1617a and 1617b. The plurality of liquid crystals 1620 form a barrier or a slit 1412a depending on the tilted angle.

When the liquid crystal layer 1606 is driven in a horizontal electric field method, it is possible to form a plurality of barriers and a plurality of slits by selectively applying a predetermined voltage to the plurality of lower electrodes 1617a and 1617b and the plurality of upper electrodes 1617c formed on the first substrate 1615. Accordingly, some of the liquid crystals overlapping one or more electrodes (e.g., the first electrode 1617a) of the plurality of lower electrodes 1617a and 1617b may form a slit 1412a that transmits light by being tilted at a third angle 1631, and the other liquid crystals 1622 overlapping the remaining ones (e.g., the second electrode 1617b) among the plurality of lower electrodes 1617a and 1617b may form a barrier 1412b that blocks the transmission of light by being tilted at a fourth angle 1632. The third angle 1631 and the fourth angle 1632 at which some of the plurality of liquid crystals 1620 are tilted may be changed, based on at least one of the visual line of the user, the direction of the first face 211, or the direction of the third face 221 such that the content is visible only to the first user 921 who owns the electronic device 900 in the direction of the predetermined visual line. Additionally or alternatively, the third angle 1631 and the fourth angle 1632 may be changed depending on the angle θ between the first housing 210 and the second housing 220. In addition, when the electronic device 900 rotates about the hinge 264, the third angle 1631 and the fourth angle 1632 may be changed, based on the rotating direction.

When the liquid crystal layer 1606 is driven in a vertical electric field method, the plurality of upper electrodes 1617c formed on the first substrate 1615 may be omitted, and a common electrode 1607 to which a common voltage is applied may be formed between the second substrate 1605 and the liquid crystal layer 1606. When the liquid crystal layer 1606 is driven in the vertical electric field manner, the DDI 404 may apply a first predetermined voltage to some (e.g., the first electrode 1617a) of the plurality of lower electrodes 1617a and 1617b formed on the first substrate 1615, and may apply a predetermined second voltage to the remaining ones (e.g., the second electrode 1617b) of the plurality of lower electrodes.

Figure 17:
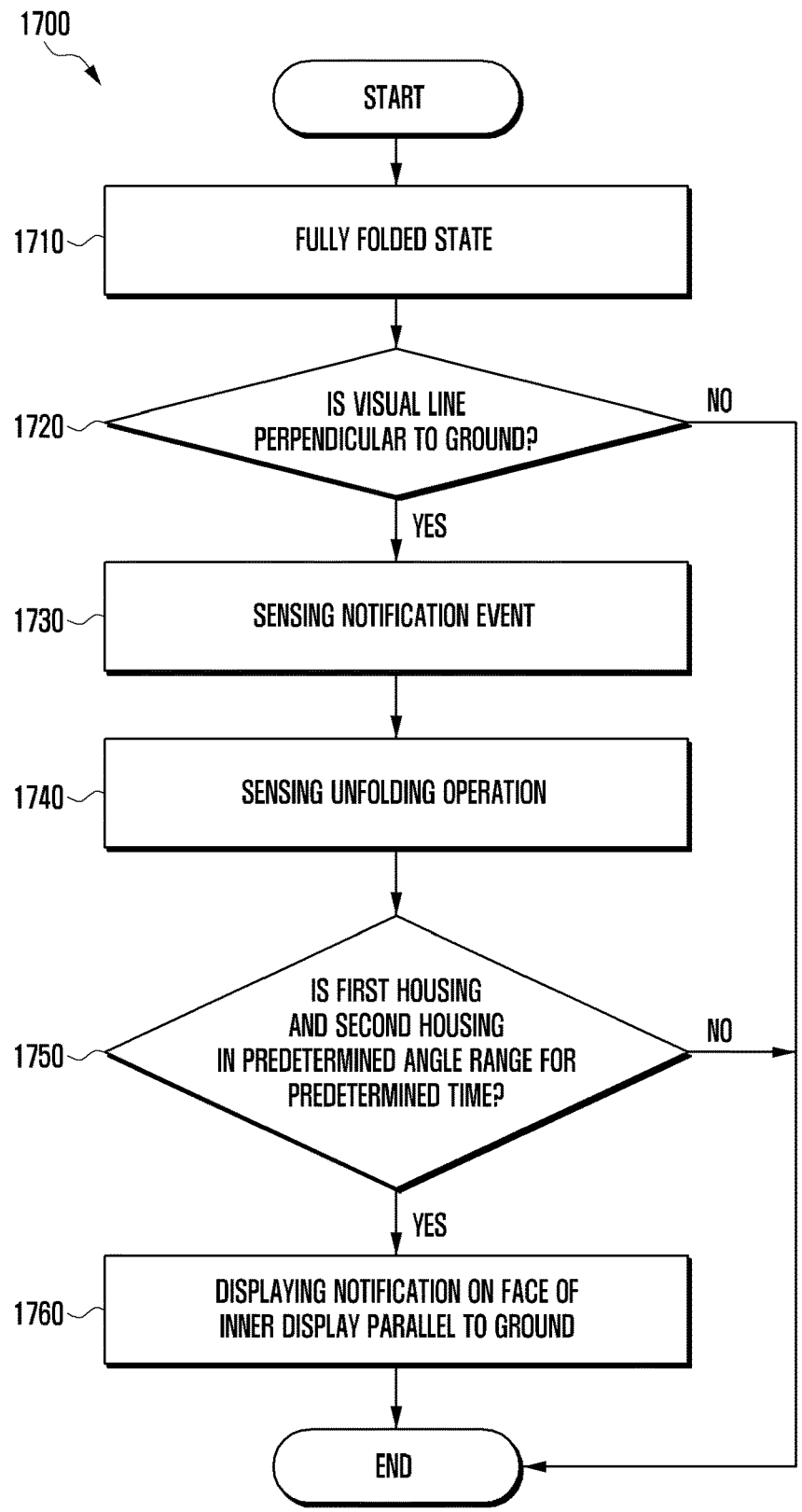
FIG. 17 is a flowchart illustrating the operation of the electronic device, according to an embodiment.

FIG. 17 is a flowchart illustrating an operation of the electronic device 900, according to an embodiment. FIG. 18 is a view for describing a method of displaying a notification message when the foldable electronic device 900 is switched from the fully folded state to the unfolded state, according to an embodiment.

Referring to FIGS. 17 and 18, an electronic device 900 is in the fully folded state in step 1710, and senses whether the visual line of the user is perpendicular to the ground in step 1720. For example, in the fully folded state, the electronic device 900 senses whether the electronic device 900 is positioned parallel to the ground (e.g., the state 1810 in FIG. 18) using the motion sensor 401. When the electronic device 900 is placed in a direction parallel to the ground in the fully folded state, it may be determined that the electronic device is in the fully folded state and the visual line of the user is perpendicular to the ground.

In step 1720, when the electronic device 900 is in the fully folded state and the visual line of the user is perpendicular to the ground (e.g., YES in step 1720), the electronic device 900 may sense a notification event. For example, the notification event may include a notification based on data received from outside the electronic device 900 or a push notification based on a setting of an application. The type and shape of the notification event is not limited herein, and may be variously changed and applied.

In step 1730, when the notification event is sensed, the electronic device 900 senses the unfolding of the electronic device 900 (e.g., the state 1820 in FIG. 18). For example, after sensing the notification event, the electronic device 900 may sense whether the electronic device 900 is switched from the fully folded state to the unfolded state.

When the unfolding of the electronic device 900 is sensed in step 1740, the electronic device 900 checks whether the first housing 210 and the second housing 220 maintain a predetermined angle therebetween for a predetermined time in step 1750. For example, the predetermined angle may be less than 90 degrees, and the predetermined angle or the predetermined time may be adjusted based on the user's setting.

In step 1760, when the first housing 210 and the second housing 220 maintain the predetermined angle for the predetermined time (e.g., YES in step 1750), a message 1811 corresponding to the notification event is displayed on a face of the display 200, which is parallel to the ground. For example, when the first housing 210 and the second housing 220 maintain the predetermined angle, one of the first face 211 or the third face 221 may be disposed parallel to the ground. Additionally, when the user gently unfolds the electronic device 900 placed on a floor in a fully folded state, one of the first face 211 or the third face 221 may be parallel to the ground. In the case where the first face 211 is disposed parallel to the first face 211 when the first housing 210 and the second housing 220 maintain the predetermined angle for the predetermined time, the electronic device 900 may display a message 1811 corresponding to the notification event on the display 200 of the first face 211.

In displaying the message 1811 corresponding to the notification event, the electronic device 900 may display the message 1811 in a direction parallel to the folding axis of the hinge 264. Accordingly, when the user gently unfolds the electronic device 900 placed on the floor in the fully folded state, since the electronic device 900 displays the notification message 1811 in a direction parallel to the direction of the folding axis of the hinge 264, the user easily sees the notification message 1811 through the gap between the first housing 210 and the second housing 220.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. An electronic device comprising:
    a foldable housing including:
        a hinge;
        a first housing connected to the hinge, and including a first face oriented in a first direction, and a second face oriented in a second direction opposite the first direction; and
        a second housing connected to the hinge, and including a third face oriented in a third direction, and a fourth face oriented in a fourth direction opposite the third direction, the second housing being folded to the first housing about the hinge,
    wherein, when the foldable housing is in a folded state, the first face faces the third face and when the foldable housing is in a fully unfolded state, the third direction conforms to the first direction;
    a sensor module;
    a display including a first portion and a second portion extending from the first face to the third face so as to form the first face and the third face, respectively;
    a processor operatively connected with the sensor module and the display; and
    a memory operatively connected with the processor,
    wherein the memory stores instructions that, when executed, cause the processor to:
        determine a visual line of a user, based on obtaining direction information of the electronic device in the fully unfolded state;
        sense an angle between the first housing and the second housing when folding of the foldable housing is sensed via the sensor module;
        determine a direction of the first face and a direction of the third face; and
        determine at least one of a position or a size of a content displayed on the display, based on at least one of the visual line of the user, the direction of the first face, or the direction of the third face.

2. The electronic device of claim 1, wherein, as an operation of determining the visual line of the user, the instructions further cause the processor to:
    determine the direction of the first face or the direction of the third face when the foldable housing is in the unfolded state; and
    determine the direction of the first face or the direction of the third face as the visual line of the user.

3. The electronic device of claim 1, wherein the sensor module includes a first motion sensor embedded in the first housing, and
    wherein, as an operation of determining the direction of the first face and the direction of the third face, the instructions further cause the processor to:
    determine the direction of the first face using the first motion sensor; and
    determine the direction of the third face, based on the direction of the first face and the angle between the first housing and the second housing.

4. The electronic device of claim 1, wherein the sensor module includes a first motion sensor embedded in the first housing and a second motion sensor embedded in the second housing, and
    wherein, as an operation of determining the direction of the first face and the direction of the third face, the instructions further cause the processor to:
    determine the direction of the first face using the first motion sensor; and
    determine the direction of the third face using the second motion sensor.

5. The electronic device of claim 1, wherein the instructions further cause the processor to:
    determine a display region and a non-display region in the display, based on at least one of the visual line of the user, the direction of the first face, or the direction of the third face; and
    display the content on the determined display region.

6. The electronic device of claim 5, wherein the instructions further cause the processor to:
    determine at least one of a position or an area of the display region, based on at least one of the visual line of the user, the direction of the first face, or the direction of the third face.

7. The electronic device of claim 5, wherein the instructions further cause the processor to:
    sense a rotation of the electronic device about a folding axis of the hinge while the content is displayed on the display region;
    re-determine the direction of the first face and the direction of the third face, based on a rotation direction of the electronic device; and
    adjust at least one of a position or a size of the content, based on the re-determined directions of the first face and the third face.

8. The electronic device of claim 7, wherein the first portion of the display is disposed to the right of the second portion when the display is viewed from above, and
    wherein the instructions further cause the processor to:
    move the content displayed on the display region in a fifth direction from the second portion toward the first portion when the electronic device rotates counter-clockwise about the folding axis of the hinge; and
    move the content displayed on the display region in a sixth direction from the first portion toward the second portion when the electronic device rotates clockwise about the folding axis of the hinge.

9. The electronic device of claim 1, wherein the instructions further cause the processor to:
    receive a notification event when the electronic device is in a fully folded state and the visual line of the user is perpendicular to a ground;
    sense unfolding of the foldable housing after receiving the notification event;

check whether a condition in which the angle between the first housing and the second housing is maintained in a predetermined range for a predetermined time is satisfied; and cause a message corresponding to the notification event to be displayed on at least one of the first face and the third face parallel to the ground when the condition is satisfied.

10. The electronic device of claim 9, wherein the instructions further cause the processor to:

cause the message corresponding to the notification event to be displayed in a direction parallel to the hinge.

11. The electronic device of claim 9, wherein the sensor module includes:

an angle sensor; and a motion sensor disposed in the first housing or the second housing.

12. A method for displaying information in an electronic device that includes a foldable housing including a hinge; a first housing connected to the hinge, and including a first face oriented in a first direction, and a second face oriented in a second direction opposite the first direction; and a second housing connected to the hinge, and including a third face oriented in a third direction, and a fourth face oriented in a fourth direction opposite the third direction, the second housing being folded to the first housing about the hinge, in which, when the foldable housing is in a folded state, the first face faces the third face and when the foldable housing is in a fully unfolded state, the third direction conforms to the first direction; a sensor module; and a display including a first portion and a second portion extending from the first face to the third face so as to form the first face and the third face, respectively, wherein the method comprises:

determining a visual line of a user, based on obtaining direction information of the electronic device in the fully unfolded state;

sensing an angle between the first housing and the second housing when folding of the foldable housing is sensed via the sensor module;

determining a direction of the first face and a direction of the third face; and determining at least one of a position or a size of a content displayed on the display, based on at least one of the visual line of the user, the direction of the first face, or the direction of the third face.

13. The method of claim 12, wherein determining the position of the content displayed on the display includes:

determining a display region and a non-display region in the display, based on at least one of the visual line of the user, the direction of the first face, or the direction of the third face; and displaying the content on the determined display region.

14. The method of claim 13, wherein determining the position of the content displayed on the display includes:

determining at least one of a position or an area of the display region, based on at least one of the visual line of the user, the direction of the first face, or the direction of the third face.

15. The method of claim 14, further comprising:

sensing a rotation of the electronic device about a folding axis of the hinge while the content is displayed on the display region;

re-determining the direction of the first face and the direction of the third face, based on a rotation direction of the electronic device; and adjusting at least one of a position or a size of the content, based on the re-determined directions of the first face and the third face.

16. The method of claim 15, wherein the first portion of the display is disposed to the right of the second portion when the display is viewed from above, and wherein adjusting the position of the content, based on the re-determined directions of the first face and the third face includes:

moving the content displayed on the display region in a fifth direction from the second portion toward the first portion when the electronic device rotates counterclockwise about the folding axis of the hinge; and moving the content displayed on the display region in a sixth direction from the first portion toward the second portion when the electronic device rotates clockwise about the folding axis of the hinge.

17. The method of claim 12, further comprising:

receiving a notification event when the electronic device is in a fully folded state and the visual line of the user is perpendicular to a ground;

sensing unfolding of the foldable housing after receiving the notification event;

checking whether a condition in which the angle between the first housing and the second housing is maintained in a predetermined range for a predetermined time is satisfied; and causing a message corresponding to the notification event to be displayed on at least one of the first face and the third face parallel to the ground when the condition is satisfied.

18. The method of claim 17, further comprising:

causing the message corresponding to the notification event to be displayed in a direction parallel to the hinge.

19. A non-transitory computer-readable storage medium with instructions stored thereon executed by at least on processor to perform a method of operating an electronic device that includes a foldable housing including a hinge; a first housing connected to the hinge, and including a first face oriented in a first direction, and a second face oriented in a second direction opposite the first direction; and a second housing connected to the hinge, and including a third face oriented in a third direction, and a fourth face oriented in a fourth direction opposite the third direction, the second housing being folded to the first housing about the hinge, in which, when the foldable housing is in a folded state, the first face faces the third face and when the foldable housing is in a fully unfolded state, the third direction conforms to the first direction; a sensor module; and a display including a first portion and a second portion extending from the first face to the third face so as to form the first face and the third face, respectively, wherein the method comprises:

determining a visual line of a user, based on obtaining direction information of the electronic device in the fully unfolded state;

sensing an angle between the first housing and the second housing when folding of the foldable housing is sensed via the sensor module;

determining a direction of the first face and a direction of the third face; and determining at least one of a position or a size of a content displayed on the display, based on at least one of the visual line of the user, the direction of the first face, or the direction of the third face.

20. The non-transitory computer-readable storage medium of claim 19, wherein the method further comprises:

sensing a rotation of the electronic device about a folding axis of the hinge while the content is displayed;
re-determining the direction of the first face and the direction of the third face, based on a rotation direction of the electronic device; and
adjusting at least one of a position or a size of the content displayed in the display region, based on the re-determined directions of the first face and the third face.

* * * * *